(12) United States Patent
Kuo et al.

(10) Patent No.: US 8,598,287 B2
(45) Date of Patent: Dec. 3, 2013

(54) METALLOCENE CATALYSTS AND THEIR USE IN POLYMERIZATION PROCESSES

(75) Inventors: Chi-I Kuo, Humble, TX (US);
Dongming Li, Houston, TX (US);
Ching-Tai Lue, Sugar Land, TX (US);
Francis C. Rix, League City, TX (US);
Mark G Goode, Hurricane, WA (US);
Daniel P. Zilker, Jr., Charleston, WV (US); Tae Hoon Kwalk, Belle Mead, NJ (US)

(73) Assignee: Univation Technologies, LLC, Houston, TX (US)

( * ) Notice: Subject to any disclaimer, the term of this patent is extended or adjusted under 35 U.S.C. 154(b) by 304 days.

(21) Appl. No.: 12/739,308

(22) PCT Filed: Oct. 9, 2008

(86) PCT No.: PCT/US2008/011607
§ 371 (c)(1),
(2), (4) Date: Aug. 9, 2010

(87) PCT Pub. No.: WO2009/054889
PCT Pub. Date: Apr. 30, 2009

(65) Prior Publication Data
US 2010/0298511 A1    Nov. 25, 2010

Related U.S. Application Data

(60) Provisional application No. 60/999,903, filed on Oct. 22, 2007.

(51) Int. Cl.
*C08F 4/6592* (2006.01)
*C08F 4/643* (2006.01)
*C08L 23/14* (2006.01)

(52) U.S. Cl.
USPC ........... 526/160; 526/126; 526/165; 526/348; 526/943

(58) Field of Classification Search
USPC ........... 526/160, 165, 352, 943, 126; 525/240
See application file for complete search history.

(56) References Cited

U.S. PATENT DOCUMENTS

| | | | |
|---|---|---|---|
| 5,281,679 A | 1/1994 | Jejelowo et al. | 526/114 |
| 5,470,811 A | 11/1995 | Jejelowo et al. | 502/117 |
| 5,798,427 A | 8/1998 | Foster et al. | 526/352 |
| 6,339,134 B1 | 1/2002 | Crowther et al. | 526/128 |
| 6,388,115 B1 | 5/2002 | Crowther et al. | 556/11 |
| 2004/0152851 A1 | 8/2004 | Weng et al. | 526/127 |
| 2004/0220359 A1 | 11/2004 | Abhari et al. | 526/65 |
| 2005/0049140 A1 | 3/2005 | Holtcamp | 502/102 |
| 2007/0055028 A1 | 3/2007 | Casty et al. | 526/127 |
| 2007/0208148 A1 | 9/2007 | Rodriguez et al. | |

FOREIGN PATENT DOCUMENTS

| | | |
|---|---|---|
| WO | WO 02/02575 | 1/2002 |
| WO | WO 03/037938 | 5/2003 |
| WO | WO 03/064433 | 8/2003 |
| WO | WO 03/064435 | 8/2003 |
| WO | WO 2004/026921 | 4/2004 |
| WO | WO 2004/026923 | 4/2004 |
| WO | WO 2004/046214 | 6/2004 |

*Primary Examiner* — Caixia Lu

(74) *Attorney, Agent, or Firm* — Jennifer A. Schmidt; Kristina Leavitt

(57) ABSTRACT

A process for polymerizing olefin(s) utilizing a cyclic bridged metallocene catalyst system to produce polymers with improved properties is provided. The catalyst system may include a cyclic bridged metallocene, $L^A(R'SiR')L^BZrQ_2$, activated by an activator, the activator comprising aluminoxane, a modified aluminoxane, or a mixture thereof, and supported by a support, where: $L^A$ and $L^B$ are independently an unsubstituted or a substituted cyclopentadienyl ligand bonded to Zr and defined by the formula $(C_5H_{4-d}R_d)$, where R is hydrogen, a hydrocarbyl substituent, a substituted hydrocarbyl substituent, or a heteroatom substituent, and where d is 0, 1, 2, 3 or 4; $L^A$ and $L^B$ are connected to one another with a cyclic silicon bridge, R'SiR', where R' are independently hydrocarbyl or substituted hydrocarbyl substituents that are connected with each other to form a silacycle ring; and each Q is a labile hydrocarbyl or a substituted hydrocarbyl ligand.

7 Claims, 5 Drawing Sheets

US 8,598,287 B2

METALLOCENE CATALYSTS AND THEIR USE IN POLYMERIZATION PROCESSES

CROSS REFERENCE TO RELATED APPLICATIONS

This application is a National Stage application under 35 U.S.C. §371 of International Application No. PCT/US2008/011607, filed Oct. 9, 2008, that claims the benefit of Ser. No. 60/999,903, filed Oct. 22, 2007, the disclosures of which are incorporated by reference in their entireties.

FIELD OF THE INVENTION

The present invention relates to processes for polymerizing olefin(s) to produce polymers having improved properties. Also, the invention is directed to a metallocene catalyst compound and catalyst system for use in the polymerization of olefin(s) to produce polymers having improved properties. In particular, the invention is directed to cyclic bridged metallocene catalyst systems, their use in a polymerization process, and products produced therefrom.

BACKGROUND OF THE INVENTION

Processability is the ability to economically process and shape a polymer uniformly. Processability involves such elements as how easily the polymer flows, melt strength, and whether or not the extrudate is distortion free. Typical metallocene catalyzed polyethylenes (mPE) are somewhat more difficult to process than low-density polyethylenes (LDPE) made in a high-pressure polymerization process. Generally, mPEs require more motor power and produce higher extruder pressures to match the extrusion rate of LDPEs. Typical mPEs also have lower melt strength which, for example, adversely affects bubble stability during blown film extrusion, and they are prone to melt fracture at commercial shear rates. On the other hand, however, mPEs exhibit superior physical properties as compared to LDPEs.

It is not unusual in the industry to add various levels of an LDPE to an mPE to increase melt strength, to increase shear sensitivity, i.e., to increase flow at commercial shear rates; and to reduce the tendency to melt fracture. However, these blends generally have poor mechanical properties as compared with neat mPE.

Traditionally, metallocene catalysts produce polymers having a narrow molecular weight distribution. Narrow molecular weight distribution polymers tend to be more difficult to process. The broader the polymer molecular weight distribution the easier the polymer is to process. A technique to improve the processability of mPEs is to broaden the products' molecular weight distribution (MWD) by blending two or more mPEs with significantly different molecular weights, or by changing to a polymerization catalyst or mixture of catalysts that produce broad MWD polymers.

In the art specific metallocene catalyst compound characteristics have been shown to produce polymers that are easier to process. For example, U.S. Pat. No. 5,281,679 discusses metallocene catalyst compounds where the ligand is substituted with a substituent having a secondary or tertiary carbon atom for the producing of broader molecular weight distribution polymers. U.S. Pat. No. 5,470,811 describes the use of a mixture of metallocene catalysts for producing easy processing polymers. Also, U.S. Pat. No. 5,798,427 addresses the production of polymers having enhanced processability using a metallocene catalyst compound where the ligands are specifically substituted indenyl ligands.

U.S. Pat. No. 6,339,134 (Crowther et al.) and U.S. Pat. No. 6,388,115 (Crowther et al.), describe a ligand metallocene catalyst compound represented by the formula $L^A L^B MQ_n$, where $MQ_n$ may be, among other things, zirconium dichloride, and $L^A$ and $L^B$ may be, among other things, open, acyclic, or fused ring(s) or ring system(s) such as unsubstituted or substituted, cyclopentadienyl ligands or cyclopentadienyl-type ligands, heteroatom substituted and/or heteroatom containing cyclopentadienyl-type ligands. The Q ligands include hydrocarbyl radicals having from 1 to 20 carbon atoms.

Particularly useful ligand metallocenes for improving processability contain cyclic bridges connecting ligands $L^A$ and $L^B$. Supported catalysts prepared from these metallocenes, as reported in U.S. Pat. No. 6,339,134 (Crowther et al.) and U.S. Pat. No. 6,388,115 (Crowther et al.), suffer from low productivities (max prod=1066 g polymer/g supported cat×h) in gas-phase polymerizations.

Metallocenes, with cyclic bridges connecting ligands $L^A$ and $L^B$, that contain two methyl leaving groups, have been supported on different support/activator combinations in WO 03/064433, WO 03/064435 and U.S. Patent Application Publication No. 2005-049140.

PCT Publication No. WO 03/064433 (Holtcamp, M. W.), relates to polymerization catalyst activator compounds that are either neutral or ionic and include a Group 13 atom, preferably boron or aluminum, bonded to at least one halogenated or partially halogenated heterocyclic ligand. The publication states that such activator compounds may be used to activate metallocene catalyst compositions. Two metallocenes, with cyclic bridges connecting ligands $L^A$ and $L^B$ were separately examined in with this activator in solution. These were cyclotetramethylenesilyl(tetramethyl cyclopentadienyl) (indenyl) zirconium dimethyl ("$(C_4H_8)Si(C_5Me_4)(C_9H_7)ZrMe_2$") and cyclotrimethylenesilyl (tetramethyl cyclopentadienyl) (indenyl) zirconium dimethyl ("$(C_3H_6)Si(C_5Me_4)(C_9H_7)ZrMe_2$"). These metallocene activator combinations suffered from low activity (maximum activity was 393 g polymer/mmol cat h). No examples of these metallocenes supported on a carrier were given.

US Patent Publication No. 2005-049140 (Holtcamp, M. W.), relates to a polymerization catalyst activator support system that employ dialuminoxanes in combination with boranes containing halogenated aryl groups and dehydrated silica. One metallocene, with a cyclic bridge connecting ligands $L^A$ and $L^B$ was examined with this activator in a slurry polymerization: cyclotetramethylenesilyl (tetramethyl cyclopentadienyl)(indenyl)zirconium dimethyl ("$(C_4H_8)Si(C_5Me_4)(C_9H_7)ZrMe_2$").

PCT Publication No. WO 03/064435 ("Holtcamp"), relates to polymerization catalyst activator compounds employing combinations of diol and halogenated aryl group 13 metal compounds. Two metallocenes, with cyclic bridges connecting ligands $L^A$ and $L^B$ were separately examined in with this activator in solution. These were cyclotetramethylenesilyl(tetramethyl cyclopentadienyl)(indenyl)zirconium dimethyl ("$(C_4H_8)Si(C_5Me_4)(C_9H_7)ZrMe_2$") and cyclotrimethylenesilyl(tetramethyl cyclopentadienyl)(indenyl)zirconium dimethyl ("$(C_3H_6)Si(C_5Me_4)(C_9H_7)ZrMe_2$"). These metallocene activator combinations were examined in solution and suffered from low activity (maximum activity was 37.8 g polymer/mmol cat h). No examples of these metallocenes supported on a carrier were given.

Hypothetical bisindenyl zirconocene dimethyl complexes employing cyclic silicon bridges are mentioned in U.S. Patent Application Publication No. 2007-055028 A1 (Casty, G. et. al.), U.S. Patent Application Publication No. 2004-220359 A1 (Abhari, R, et. al.), U.S. Patent Application Publication No. 2004-152851 A1 (Weng, W., et. al.), WO 2004/046214 A2 (Jiang, P., et. al.), WO 2004/026923 A2 (Arjunan, P., et. al.), WO 2004/026921 A1 (Brant, P., et. al.), WO 2002/002575 A1 (Kuchta, M., et. al.). These metallocenes were not prepared.

SUMMARY OF THE INVENTION

This invention relates generally to polymerization processes utilizing a cyclic bridged metallocene catalyst for producing polymer products that have improved properties. Also, the invention is directed to improve bridged metallocene catalyst compounds having a cyclic bridge, catalyst systems comprising these compounds, and polymerizing processes utilizing these compounds.

According to an aspect of the present invention, there is provided an olefin polymerization catalyst system comprising a cyclic bridged metallocene, $L^A(R'SiR')L^B ZrQ_2$, activated by an activator, the activator comprising an aluminoxane and supported by a support.

The cyclic bridged metallocene, $L^A(R'SiR')L^B ZrQ_2$, is comprised of $L^A$ and $L^B$ connected to one another with a cyclic silicon bridge, R'SiR', where each R' are independently hydrocarbyl or substituted hydrocarbyl substituents that are connected with each other to form a silacycle ring. Each of the ligands is bound to a zirconium atom. Ligands $L^A$ and $L^B$ are unsubstituted or substituted cyclopentadienyl ligands as described by the formula $(C_5H_{4-d}R_d)$, where d is an integer selected from 0, 1, 2, 3 or 4 and R is hydrogen, a hydrocarbyl substituent, a substituted hydrocarbyl substituent or a heteroatom substituent. The two leaving groups Q are labile hydrocarbyl or substituted hydrocarbyl ligands.

The terms "support" or "carrier" are used interchangeably and are any support material, preferably a porous support material, for example, talc, inorganic oxides and inorganic chlorides. Other carriers include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The catalyst system may be formed by first combining the activator with the support, and then by adding thereto the $L^A(R'SiR')L^B ZrQ_2$.

One advantage of this polymerization catalyst is improved productivity relative to other cyclic bridged metallocene catalyst/activator/support combinations in slurry or gas-phase processes.

The catalyst system may be used in the making of a polymer comprising, as monomers, ethylene, an olefin monomer having from 3 to 8 carbon atoms, and optionally one or more other olefin monomers having from 2 to 30 carbon atoms such as, hexane or butene. The use may be for controlling product melt index, for controlling molecular weight distribution, or for controlling film haze. The polymer product may have a density of 0.910 to 0.945 g/cc, or 0.915 to 0.935 g/cc.

The catalyst system may be used for producing a polymer product with broad or bimodal distribution in molecular weight or melt index, in a single reactor, comprising, as monomers, ethylene, an olefin monomer having from 3 to 8 carbon atoms, and optionally one or more other olefin monomers having from 2 to 30 carbon atoms, by changing comonomer, terpolymer, or polymer ratio in a controlled manner. The catalyst system may be used for producing a polymer product with broad or bimodal distribution in density in a single reactor, comprising, as monomers, ethylene, an olefin monomer having from 3 to 8 carbon atoms, and optionally one or more other olefin monomers having from 2 to 30 carbon atoms, in a controlled manner. The monomers may be ethylene and butene. The monomers may be ethylene, butene and at another olefin monomer having from 2 to 30 carbon atoms.

The polymer product may have a molecular weight distribution (Mw/Mn) of no greater than about 4.2, or about 3.6 to about 4.2.

In another aspect, there is provided a use of a minor amount, 1% to about 50% by weight, or about 5 to about 20% by weight, of a polymer comprising, as monomers, ethylene, an olefin monomer having from 3 to 8 carbon atoms, and optionally one or more other olefin monomers having from 2 to 30 carbon atoms made using $L^A(R'SiR')L^B ZrQ_2$ as a catalyst, for blending with another polymer comprising olefin monomers having from 2 to 30 carbon atoms, to improve film haze.

In one embodiment, the invention relates to the manufacture of a high productivity cyclic bridged metallocene supported catalyst for the production of polymers from ethylene and other olefins. In one embodiment, the cyclic bridged metallocene catalyst comprises $(CH_2)_4Si(C_5Me_4)(C_5H_4)Zr(CH_3)_2$, methyl aluminoxane and silica (average particle size of 40μ, average surface area 300 m²/g, dehydrated at 600° C.). This catalyst system was highly productive for manufacture of copolymers of ethylene and butene in a gas-phase process. The productivity of at least 1786 g Polymer/(g cat h) or greater at 70° C. and 170 psi partial pressure of ethylene was greater than any productivity previously seen for supported cyclic-bridged metallocene in a slurry or gas-phase process. This higher productivity is even under adverse conditions of lower ethylene partial pressure and temperature than in previously described systems.

Other aspects and features of the present invention will become apparent to those ordinarily skilled in the art upon review of the following description of specific embodiments of the invention.

BRIEF DESCRIPTION OF THE DRAWINGS

Embodiments of the present invention will now be described, by way of example only, with reference to the attached Figures, wherein.

DETAILED DESCRIPTION

Figure 1:
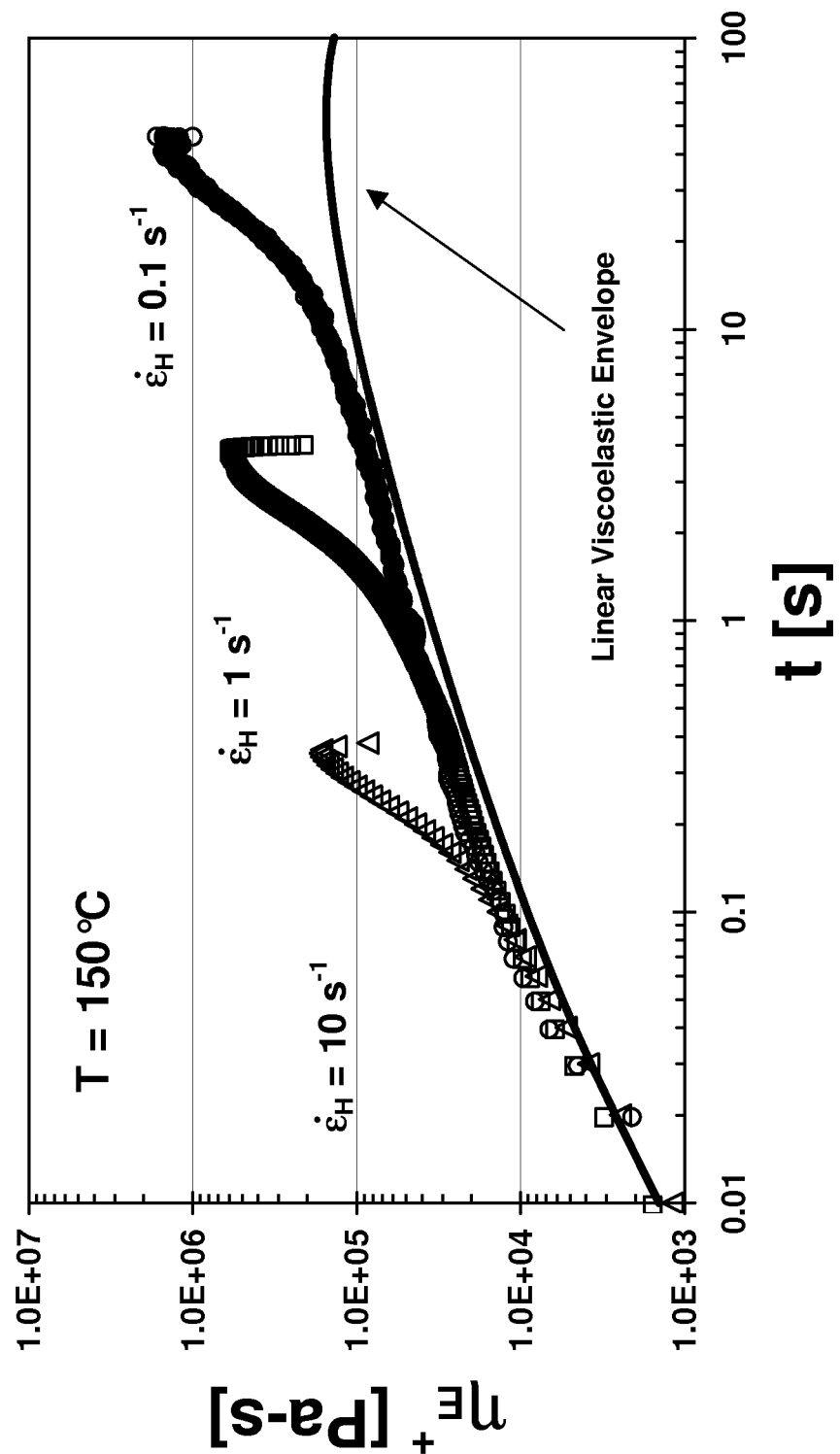
FIGS. 1 and 2 contain graphs of strain hardening of an HP-LDPE ExxonMobil LD103.09 polymer; and a polymer made using $(C_4H_8)Si(C_5Me_4)(C_5H_4)ZrMe_2$ as the catalyst, respectively.

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the"

include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC).

Cyclic Bridged Metallocene Catalysts

Cyclic bridged metallocene catalysts according to an embodiment of the instant invention are comprised of a cyclic bridged metallocene, as shown in equation I, an activator, and a support.

$$L^A(\text{R'SiR'})L^B\text{ZrQ}_2 \quad (I)$$

The cyclic bridged metallocenes are shown in equation I. They contain two ligands $L^A$ and $L^B$ connected to one another with a cyclic silicon bridge, R'SiR'. Each of the ligands is bound to a zirconium atom. In one preferred embodiment, at least one ligand is η-bonded to a metal atom, most preferably η$^5$-bonded to the metal atom. Two leaving groups Q are bonded to the zirconium atom.

In a preferred embodiment, the ligands $L^A$ and $L^B$ are unsubstituted or substituted cyclopentadienyl ligands as described by the formula $(C_5H_{4-d}R_d)$, where d is an integer selected from 0, 1, 2, 3 or 4 and R is hydrogen, a hydrocarbyl substituent, a substituted hydrocarbyl substituent or a heteroatom substituent. At least two R groups, preferably two adjacent R groups, may join to form a ring structure. Also, a substituent group R group such as 1-butanyl may form a carbon sigma bond to zirconium.

Hydrocarbyl substituents are made up of between 1 and 100 carbon atoms, the remainder being hydrogen. Non-limiting examples of hydrocarbyl substituents include linear or branched or cyclic: alkyl radicals; alkenyl radicals; alkynyl radicals; cycloalkyl radicals; aryl radicals; alkylene radicals, or a combination thereof. Non-limiting examples include methyl, ethyl, propyl, butyl, pentyl, hexyl, cyclopentyl, cyclohexyl; olefinically unsaturated substituents including vinyl-terminated ligands (for example but-3-enyl, prop-2-enyl, hex-5-enyl and the like), benzyl or phenyl groups and the like, including all their isomers, for example tertiary butyl, isopropyl, and the like.

Substituted hydrocarbyl substituents are made up of between 1 and 100 carbon atoms, the remainder being hydrogen, fluorine, chlorine, bromine, iodine, oxygen, sulfur, nitrogen, phosphorous, boron, silicon, germanium or tin atoms. Substituted hydrocarbyl substituents are carbon based radicals. Non-limiting examples of substituted hydrocarbyl substituents trifluoromethyl radical, trimethylsilyl, trimethylsilanemethyl($Me_3SiCH_2$—) radicals.

Heteroatom substituents are fluorine, chlorine, bromine, iodine, oxygen, sulfur, nitrogen, phosphorous, boron, silicon, germanium or tin based radicals. Thus, heteroatom substituents include organometalloid radicals. Non-limiting examples of heteroatom substituents include, methoxy radical, diphenyl amino radical, thioalkyl, thioalkenyl, methyltrimethylsilyl radical, dimethyl aluminum radicals, tris(perfluorophenyl)boron and the like.

Non-limiting examples of ligands include cyclopentadienyl ligands, indenyl ligands, benzindenyl ligands, fluorenyl ligands, octahydrofluorenyl ligands, including hydrogenated versions thereof, for example tetrahydroindenyl ligands. In one embodiment, $L^A$ and $L^B$ may be any other ligand structure capable of η-bonding to M, preferably η$^3$-bonding to M, and most preferably η$^5$-bonding to M.

In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand.

In one embodiment, the cyclic bridged metallocene catalyst compounds are those where the R substituents on the ligands $L^A$ and $L^B$, $(C_5H_{4-d}R_d)$ of formula (I) is substituted with the same or different number of substituents on each of the ligands. In another embodiment, the ligands $L^A$ and $L^B$, $(C_5H_{4-d}R_d)$ of formula (I) are different from each other.

In a preferred embodiment, the ligands of the metallocene catalyst compounds of formula (I) are asymmetrically substituted. In another preferred embodiment, at least one of the ligands $L^A$ and $L^B$, $(C_5H_{4-d}R_d)$ of formula (I) is unsubstituted. More preferably, $L^A$ is $C_5Me_4$, where Me is methyl, and $L^B$ is $C_5H_4$.

The two ligands are joined with a cyclic bridging group (R'SiR') where R' are independently hydrocarbyl or substituted hydrocarbyl substituents that are connected with each other to form a silacycle ring. Non-limiting examples of cyclic bridging groups include cyclo-tri or tetra-alkylene silyl groups. Non-limiting examples of cyclic bridging groups are represented by the following structures:

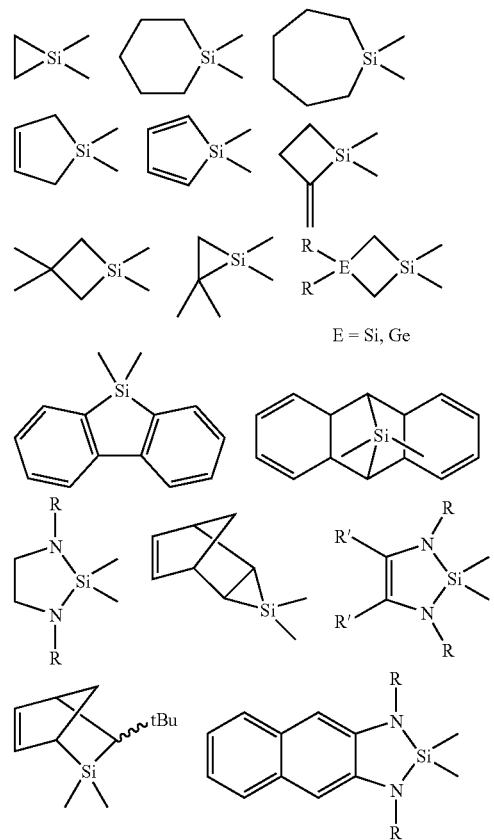

-continued

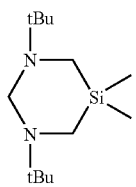

Preferably, the silacycle ring is a 3-5 member ring. More preferably the silacycle is a 4-5 member ring. More preferred cyclic bridging groups include cyclotrimethylenesilyl or cyclotetramethylenesilyl. Most preferred is cyclotetramethylenesilyl.

The two leaving groups Q are labile hydrocarbyl or substituted hydrocarbyl ligands. Q may also include hydrocarbyl groups having ethylenic or aromatic unsaturation thereby forming a $\eta^3$ bond to Zr. Also, two Q's may be an alkylidene, or a cyclometallated hydrocarbyl. Also, two Q's may be a coordinated diene or polyene such as butadiene or isoprene. Preferably, Q originates from butadiene or isoprene. More preferably, Q is allyl, benzyl, trimethylsilylmethyl, or methyl. Most preferably, Q is methyl.

In a preferred embodiment, the metallocene catalyst compounds of the invention include cyclotrimethylenesilyl(tetramethyl cyclopentadienyl)(cyclopentadienyl)zirconium dimethyl, cyclotetramethylenesilyl(tetramethyl cyclopentadienyl)(cyclopentadienyl)zirconium dimethyl, cyclotrimethylenesilyl (tetramethyl cyclopentadienyl)(2-methyl indenyl) zirconium dimethyl, cyclotrimethylenesilyl(tetramethyl cyclopentadienyl)(3-methyl cyclopentadienyl)zirconium dimethyl, cyclotrimethylenesilyl bis(2-methyl indenyl)zirconium dimethyl, cyclotrimethylenesilyl(tetramethyl cyclopentadienyl)(2,3,5-trimethyl cyclopentadienyl)zirconium dimethyl, and cyclotrimethylenesilyl bis(tetra methyl cyclopentadienyl)zirconium dimethyl. In the most preferred embodiment, the metallocene catalyst compound is cyclotetramethylenesily(tetramethyl cyclopentadienyl)(cyclopentadienyl) zirconium dimethyl.

Activator and Activation Methods for the Metallocene Catalyst Compounds

The above described cyclic bridged metallocene catalyst compounds can be activated with an activator comprising an aluminoxane or the product of an aluminoxane and a support or carrier. This activation yields catalyst compounds capable of polymerizing olefins.

It is well known in the art that aluminoxanes contain a broad distribution of structures formed from the reaction of R"3Al or mixtures of R"3Al, where R" is hydrogen or a similar or different hydrocarbyl, with water. This is in contrast with dialuminoxanes which have a specific structure. It is also well recognized that aluminoxanes may contain alanes, R"3Al, remaining from an incomplete hydrolysis reaction.

There are a variety of methods for preparing aluminoxane and modified aluminoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451 5,744,656, European Publication Nos. EP-A-0 561 476, EP-B1-0 279 586 and EP-A-0 594-218, and PCT Publication No. WO 94/10180.

Activation may also occur in the presence of aluminoxanes combined in series or in parallel with other activators capable of converting cyclic bridged metallocenes into olefin polymerization catalysts.

Non-limiting additional activators, for example may include a Lewis acid or a non-coordinating ionic activator or ionizing activator or any other compound including Lewis bases, aluminum alkyls, conventional-type cocatalysts or an activator-support and combinations thereof that can convert a neutral metallocene catalyst compound to a catalytically active metallocene cation. It is within the scope of this invention to use aluminoxane or modified aluminoxane as an activator, and/or to also use ionizing activators, neutral or ionic, such as tri(n-butyl)ammonium tetrakis(pentafluorophenyl) boron or a trisperfluorophenyl boron metalloid precursor or a trisperfluoronaphtyl boron metalloid precursor that would ionize the neutral metallocene catalyst compound.

In one embodiment, an additional activation method using ionizing ionic compounds not containing an active proton but capable of producing both a metallocene catalyst cation and a non-coordinating anion are also contemplated, and are described in EP-A-0 426 637, EP-A-0 573 403 and U.S. Pat. No. 5,387,568.

Additional ionizing compounds may contain an active proton, or some other cation associated with but not coordinated to or only loosely coordinated to the remaining ion of the ionizing compound. Such compounds and the like are described in European Publication Nos. EP-A-0 570 982, EP-A-0 520 732, EP-A-0 495 375, EP-A-500 944, EP-A-0 277 003 and EP-A-0 277 004, U.S. Pat. Nos. 5,153,157, 5,198,401, 5,066,741, 5,206,197, 5,241,025, 5,384,299 and 5,502,124.

Other additional activators include those described in WO 98/07515 such as tris(2,2',2"-nonafluorobiphenyl)fluoroaluminate. Combinations of activators are also contemplated by the invention, for example, aluminoxanes and ionizing activators in combinations, see for example, WO 94/07928 and WO 95/14044, and U.S. Pat. Nos. 5,153,157 and 5,453,410. WO 98/09996 describes activating metallocene catalyst compounds with perchlorates, periodates and iodates including their hydrates. WO 98/30602 and WO 98/30603, describe the use of lithium (2,2'-bisphenyl-ditrimethylsilicate). 4THF as an activator for a metallocene catalyst compound. Also, methods of activation such as using radiation (see EP-B1-0 615 981), electro-chemical oxidation, and the like are also contemplated as activating methods for the purposes of rendering the neutral metallocene catalyst compound or precursor to a metallocene cation capable of polymerizing olefins.

It is further contemplated that other catalysts can be combined with the cyclic bridged metallocene catalyst compounds of embodiments of the present invention. For example, see U.S. Pat. Nos. 4,937,299, 4,935,474, 5,281,679, 5,359,015, 5,470,811, and 5,719,241.

In another embodiment, one or more metallocene catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031, and WO 96/23010.

Method for Supporting

The above described cyclic metallocene catalyst compounds and catalyst systems may be combined with one or more support materials or carriers using one of the support methods well known in the art or as described below. In the preferred embodiment, the method of an embodiment of the invention uses a polymerization catalyst in a supported form. For example, in a most preferred embodiment, a metallocene catalyst compound or catalyst system is in a supported form, for example deposited on, bonded to, contacted with, or incorporated within, adsorbed or absorbed in, or on, a support or carrier.

The terms "support" or "carrier" are used interchangeably and are any support material, preferably a porous support material, for example, talc, inorganic oxides and inorganic chlorides. Other carriers include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred carriers are inorganic oxides that include Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite (EP-131 0 511 665) and the like. Also, combinations of these support materials may be used, for example, silica-chromium, silica-alumina, silica-titania and the like.

It is preferred that the carrier, most preferably an inorganic oxide, has a surface area in the range of from about 10 to about 700 m$^2$/g, pore volume in the range of from about 0.1 to about 4.0 cc/g and average particle size in the range of from about 5 to about 500 μm. More preferably, the surface area of the carrier is in the range of from about 50 to about 500 m$^2$/g, pore volume of from about 0.5 to about 3.5 cc/g and average particle size of from about 10 to about 200 μm. Most preferably the surface area of the carrier is in the range is from about 100 to about 400 m$^2$/g, pore volume from about 0.8 to about 3.0 cc/g and average particle size is from about 5 to about 100 μm. The average pore size of the carrier of embodiments of the invention may have a pore size in the range of from 10 to 1000 Å, preferably 50 to about 500 Å, and most preferably 75 to about 350 Å.

Examples of supporting the metallocene catalyst systems of embodiments of the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, WO 95/32995, WO 95/14044, WO 96/06187 and WO 97/02297.

In one embodiment, the cyclic bridged metallocene catalyst compounds of embodiments of the invention may be deposited on the same or separate supports together with an activator, or the activator may be used in an unsupported form, or may be deposited on a support different from the supported metallocene catalyst compounds of an embodiment of the invention, or any combination thereof.

There are various other methods in the art for supporting a polymerization catalyst compound or catalyst system of an embodiment of the invention. For example, the cyclic bridged metallocene catalyst compound of amn embodiment of the invention may contain a polymer bound ligand as described in U.S. Pat. Nos. 5,473,202 and 5,770,755, the metallocene catalyst system of tan embodiment of the invention may be spray dried as described in U.S. Pat. No. 5,648,310, the support used with the cyclic bridged metallocene catalyst system of an embodiment of the invention is functionalized as described in European Publication No. EP-A-0 802 203, or at least one substituent or leaving group is selected as described in U.S. Pat. No. 5,688,880.

In a preferred embodiment, there is provided a supported cyclic bridged metallocene catalyst system that includes an antistatic agent or surface modifier that is used in the preparation of the supported catalyst system as described in PCT Publication No. WO 96/11960. The catalyst systems of an embodiment of the invention can be prepared in the presence of an olefin, for example hexene-1.

A preferred method for producing the supported cyclic bridged metallocene catalyst system of an embodiment of the invention is described below and is described in WO 96/00245 and WO 96/00243. In this preferred method, the cyclic bridged metallocene catalyst compound is slurried in a liquid to form a metallocene solution and a separate solution is formed containing an activator and a liquid. The liquid may be any compatible solvent or other liquid capable of forming a solution or the like with the cyclic bridged metallocene catalyst compounds and/or activator of an embodiment of the invention. In the most preferred embodiment, the liquid is a cyclic aliphatic or aromatic hydrocarbon, most preferably toluene. The cyclic bridged metallocene catalyst compound and activator solutions are mixed together and added to a porous support or the porous support is added to the solutions such that the total volume of the metallocene catalyst compound solution and the activator solution or the metallocene catalyst compound and activator solution is less than four times the pore volume of the porous support, more preferably less than three times, even more preferably less than two times; preferred ranges being from 1.1 times to 3.5 times range and most preferably in the 1.2 to 3 times range. Another preferred method is to pre-react the porous support with an activator in a hydrocarbon diluent. The hydrocarbon solution of the cyclic bridged metallocene is added later to complete the catalyst preparation.

Procedures for measuring the total pore volume of a porous support are well known in the art. Details of one of these procedures are discussed in Volume 1, Experimental Methods in Catalytic Research (Academic Press, 1968) (specifically see pages 67-96). This preferred procedure involves the use of a classical BET apparatus for nitrogen absorption. Another method well known in the art is described in Innes, Total Porosity and Particle Density of Fluid Catalysts By Liquid Titration, Vol. 28, No. 3, Analytical Chemistry 332-334 (March, 1956).

The mole ratio of the metal of the activator component to the metal of the supported cyclic bridged metallocene catalyst compounds are in the range of between 0.3:1 to 1000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the cyclic bridged metallocene catalyst is preferably in the range of between 0.3:1 to 3:1.

In a preferred embodiment, the catalyst system comprises a catalyst as described herein activated by methylaluminoxane (MAO) and supported by silica. While conventionally, MAO is combined with a metallocene and then the combination is deposited on silica, as shown in the examples, the preference herein is to first combine the activator (e.g. MAO) and the support (e.g. silica) and then to add the catalyst to the combination. Modified MAO (MMAO) or a combination of MAO and MMAO may also be used.

In one embodiment of the invention, olefin(s), preferably $C_2$ to $C_{30}$ olefin(s) or alpha-olefin(s), preferably ethylene or propylene or combinations thereof are prepolymerized in the presence of the cyclic bridged metallocene catalyst system of an embodiment of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578, European Publication No. EP-B-0279 863, and PCT Publication No. WO 97/44371.

In one embodiment, the cyclic bridged metallocene catalysts of embodiments of the invention can be combined with a carboxylic acid salt of a metal ester, for example aluminum carboxylates such as aluminum mono, di- and tri-stearates, aluminum octoates, oleates and cyclohexylbutyrates, as described in U.S. Pat. No. 6,300,436.

Polymerization Process

The catalysts and catalyst systems of embodiments of the invention described above are suitable for use in gas-phase or slurry processes over a wide range of temperatures and pressures. The most preferred process is a gas phase process. The temperatures may be in the range of from −60° C. to about 280° C., preferably from 50° C. to about 200° C., and the pressures employed may be in the range from 1 atmosphere to about 500 atmospheres or higher.

The gas phase or slurry phase processes may be conducted in combination with each-other or with a high pressure or solution process. Particularly preferred is a gas phase or slurry phase polymerization of one or more olefins at least one of which is ethylene or propylene.

In one embodiment, the process of this invention is directed toward a slurry or gas phase polymerization process of one or more olefin monomers having from 2 to 30 carbon atoms, preferably 2 to 12 carbon atoms, and more preferably 2 to 8 carbon atoms. An Embodiment of the invention are particularly well suited to the polymerization of two or more olefin monomers of ethylene, propylene, butene-1, pentene-1, 4-methyl-pentene-1, hexene-1, octene-1 and decene-1.

Other monomers useful in the process of embodiments of the invention include ethylenically unsaturated monomers, diolefins having 4 to 18 carbon atoms, conjugated or nonconjugated dienes, polyenes, vinyl monomers and cyclic olefins. Non-limiting monomers useful in an embodiment of the invention may include norbornene, norbornadiene, isobutylene, isoprene, vinylbenzocyclobutane, styrenes, alkyl substituted styrene, ethylidene norbornene, dicyclopentadiene and cyclopentene.

In a preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. In the most preferred embodiment, a copolymer of ethylene and butene is produced.

In another embodiment of the process of the invention, ethylene or propylene is polymerized with at least two different comonomers, optionally one of which may be a diene, to form a terpolymer. In one embodiment, two of the three monomers of the terpolymer are butene and ethylene. In one embodiment, the comonomer content is 1.0 to 20.0 wt %, or 2.0 to 15.0 wt %. As seen in example 5 below, the use of $(C_4H_8)Si(C_5Me_4)(C_5H_4)ZrMe_2$ as the catalyst in preparing an ethylene/butene copolymer, resulted in a sharp response to comonomer ratio. That is, the melt index (MI) changed quickly and sharply as the comonomer ratio was adjusted. Density changes were also observed. These changes may be associated with long chain branching. Therefore, polymers having ethylene and butene as two of the monomers may be used to control product melt index. Further, products with broad or bimodal distribution in molecular weight or melt index in a single reactor using a single catalyst could be used by changing the comonomer feed in a controlled fashion, thus producing polyethylene products with custom designed properties with single reactor economics.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged metallocene catalysts as described in U.S. Pat. Nos. 5,296,434 and 5,278,264.

Typically in a gas phase polymerization process, a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399, 4,588,790, 5,028,670, 5,317,036, 5,352,749, 5,405,922, 5,436,304, 5,453,471, 5,462,999, 5,616,661 and 5,668,228.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of an embodiment of the invention include those described in U.S. Pat. Nos. 5,627,242, 5,665,818 and 5,677,375, and European Publication Nos. EP-A-0 794 200, EP-A-0 802 202 and EP-B-634 421.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexene or an isobutene medium is employed.

A preferred polymerization technique of an embodiment of the invention is referred to as a particle form polymerization, or a slurry process where the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484.

In an embodiment the reactor used in the slurry process of the invention is capable of and the process of an embodiment of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of an embodiment of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555.

A preferred process of an embodiment of the invention is where the process, preferably a slurry or gas phase process is operated in the presence of a cyclic bridged metallocene catalyst system of an embodiment of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in WO 96/08520 and U.S. Pat. Nos. 5,712,352 and 5,763,543. In another preferred embodiment of the process of the invention, the process is operated by introducing a benzyl compound into the reactor and/or contacting a benzyl compound with the metallocene catalyst system of an embodiment of the invention prior to its introduction into the reactor.

Polymer Product of Embodiments of the Invention

The properties of the polymers were determined by the test methods listed in Table 1 or described herein.

TABLE 1

Test Methods

| Property | Units | Procedure |
|---|---|---|
| Melt Indices, Melt Flow Ratios | dg/min | ASTM D-1238 |
| Density | g/cc | ASTM D-1505 |
| Haze | % | ASTM D-1003 |
| Gloss @ 45° | % | ASTM D-2457 |
| Tensile @ Yield | mPa | ASTM D-882 |
| Elongation @ Yield | % | ASTM D-882 |
| 1% Secant Modulus | mPa | ASTM D-882 |
| Dart Drop Impact | g/µm | ASTM D-1709 (A) |
| Elmendorf Tear Resistance | g/µm | ASTM D-1922 |
| Melt Strength | cN | As described in Specification |

Long chain branching (LCB) index for the whole sample (i.e., $g'_{avg}$) and slice long chain branching (SLCB) index (i.e., g') are described in U.S. Pat. No. 6,870,010.

Polymers of the instant invention may have enhanced optical and shrinkage properties, as discussed further below.

The polymers produced by a process of an embodiment of the invention can be used in a wide variety of products and end-use applications. The polymers produced include linear low-density polyethylene, plastomers, high-density polyethylenes, low-density polyethylenes, polypropylene and polypropylene copolymers. The polymers may be made up of, at least partially, butene, ethylene, and other olefin monomers having from 2 to 20 carbon atoms. For instance, the polymers may be copolymers of butene and ethylene, or terpolymers of butene, ethylene, and other olefin monomer.

The polymers, typically ethylene based polymers, have a density in the range of from 0.90 g/cc to 0.97 g/cc, preferably in the range of from 0.90 g/cc to 0.965 g/cc, more preferably in the range of from 0.90 g/cc to 0.96 g/cc, even more preferably in the range of from 0.905 g/cc to 0.95 g/cc, yet even more preferably in the range from 0.910 g/cc to 0.945 g/cc, and most preferably greater than 0.915 g/cc to about 0.935 g/cc.

The melt strength of the polymers produced using the catalyst of an embodiment of the invention are preferably greater than 4 cN, preferably greater than 5 cN and, preferably less than 10 cN. For purposes of this patent application and appended claims melt strength is measured with a capillary rheometer (RHEO-TESTER™ 1000, Goettfert, Rock Hill, S.C.) in conjunction with the Goettfert Rheotens melt strength apparatus (RHEOTENS™ 71.97). A polymer melt strand extruded from the capillary die is gripped between two counter-rotating wheels on the apparatus. The take-up speed is increased at a constant acceleration of 12 mm/sec$^2$, which is controlled by the WinRHEO™ program provided by Goettfert. The maximum pulling force (in the unit of cN) achieved before the strand breaks or starts to show draw-resonance is determined as the melt strength. The temperature of the rheometer is set at 190° C. The barrel has a diameter of 12 mm. The capillary die has a length of 30 mm and a diameter of 2 mm. The polymer melt is extruded from the die at a piston speed of 0.49 mm/sec. The apparent shear rate for the melt in the die is, therefore, 70 sec$^{-1}$ and the speed at die exit is 17.5 mm/sec. The distance between the die exit and the wheel contact point should be 125 mm.

Polymers of embodiments of the instant invention have a combination of exceptionally high shear thinning for extrusion, outstanding film optical property and excellent shrink performance. Historically HD-LDPE is the only product family having most of these attributes. However, the clarity of HP-LDPE is far inferior to polymers of embodiments of the instant invention. Conventional ZN-LLDPE are lacking of most of these attributes. Some easy process (i.e., very broad MWD) products from gas phase and/or slurry processes, are typically very poor in optical properties. The shrink property of these conventional products is also somewhat insufficient for shrink application. $(C_4H_8)Si(C_5Me_4)(C_5H_4)ZrMe_2$ was found to be very effective in reducing the film haze of various LLDPE (especially for a polymer made using (1,3-Me, n-Bu-Cp)$_2$ZrCl$_2$ as the catalyst and for a polymer made using $(C_5H_4\text{—}CH_2CH_2CH_3)_2Hf(CH_3)_2$.

Figure 2:
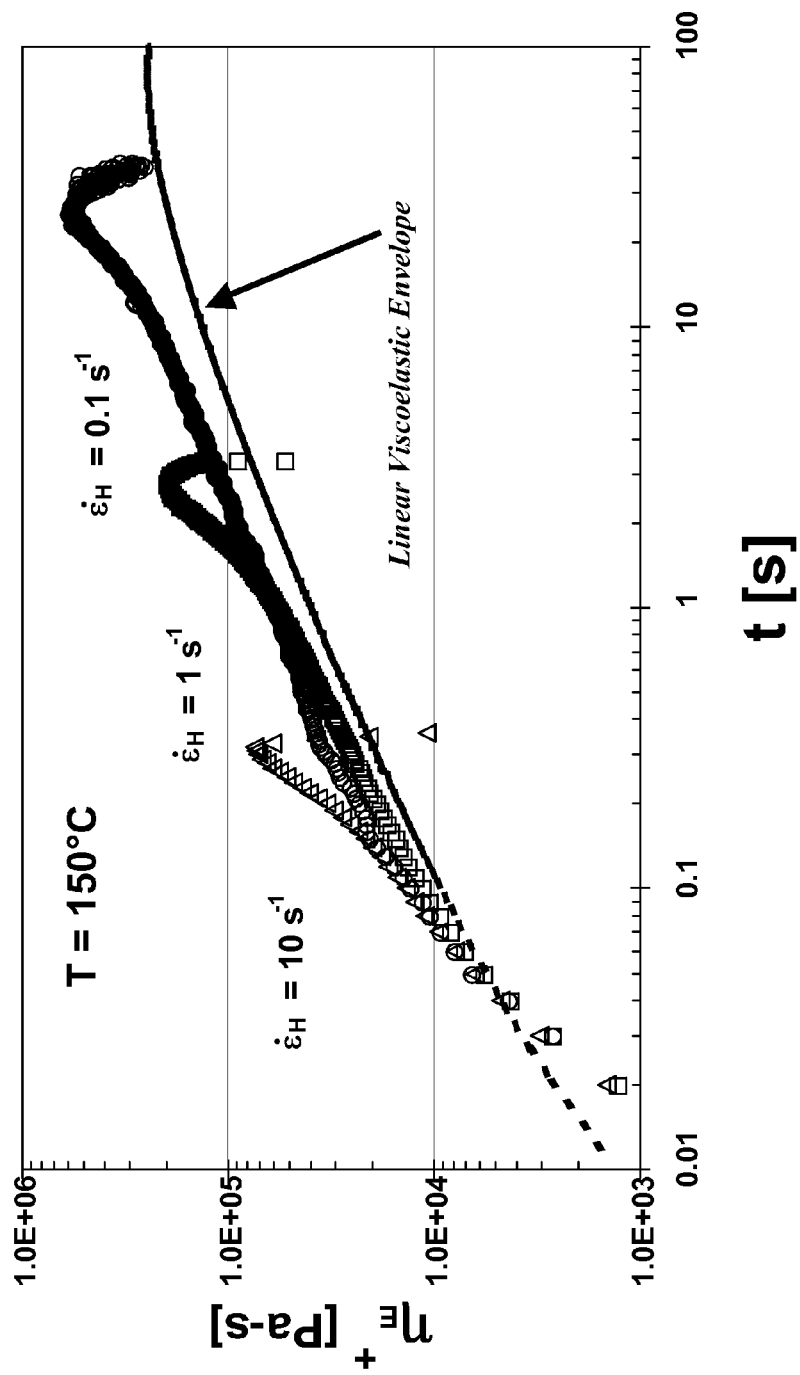

As shown in FIG. 2, polymers of embodiments of the instant invention exhibited strain-hardening behavior under the transient uniaxial extensional flow, similar to HP-LDPE. As shown in Table 4, polymers of embodiments of the instant invention have broad MFR (over 100), which is an indicator of good processability. The films from these products have TD shrinkage comparable to or better than HP-LDPE, optical properties similar to HP-LDPE. Compared with a high-pressure ethylene polymerization process, a gas phase reactor also has the added benefit of lower cost and, in general, higher capacity.

The strain hardening at 150° C. of Comparative Example A (ExxonMobil LD103.09, from Exxon Mobil Chemical Company, Houston, Tex.) and Example 5 are respectively shown in FIGS. 1 and 2. The following two references discuss strain hardening of polyolefins and the test for measuring the same: "Strain hardening of various polyolefins in uniaxial elongational flow", The Society of Rheology, Inc. J. Rheol. 47(3), 619-630 (2003); and "Measuring the transient extensional rheology of polyethylene melts using the SER universal testing platform", The Society of Rheology, Inc. J. Rheol. 49(3), 585-606 (2005).

RETRAMAT Shrink Test

The RETRAMAT shrink test used herein is based on NFT 54-125 and ASTM D 2838-95, procedure A. Methods DIN 53-369 and ISO/DIS 14616 only cover the shrink force measurement, but do not give guidelines on the simultaneous measurement of shrink percentages. The ASTM method covers the determination of the plastic shrink tension and related shrink characteristics shrink force and orientation release stress of heat-shrinkable film of less than 800 μm thickness, while the specimen is totally restrained from shrinking as it is heated. The NFT 54-125 method covers the total shrinking process, being both the plastic and the thermal shrink process.

The method used herein consists of exposing two film samples to a given temperature, during a given time, and to cool them down at room temperature, simulating what happens inside a shrinkage installation. For each test sample, a minimum of 10 strips of ±150 mm length and 15 mm width are prepared for both MD and TD on a sample cutter. Retramat stickers are applied onto the sample edges so that the shrink area of the test specimen measures exactly 100 mm in length. The oven temperature is 190° C. and the closing duration is 45 seconds. During the test, one of the samples is connected to a force transducer, while the other is connected to a displacement transducer. A thermocouple allows following up the temperature at a few millimetres from the middle of the sample. The 3 parameters (force-displacement-temperature) are continuously displayed on the Retramat and recorded on a lab PC.

The polymers produced by the process of an embodiment of the invention may have a molecular weight distribution, a weight average molecular weight to number average molecular weight ($M_w/M_n$) of greater than 1.5 to about 15, particularly greater than 2 to about 10, more preferably greater than about 2.5 to less than about 8, and most preferably from 3.0 to 8.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.01 dg/min to about 50 dg/min, even more preferably from about 0.01 dg/min to about 10 dg/min, and most preferably from about 0.05 dg/min to about 10 dg/min.

Figure 3:
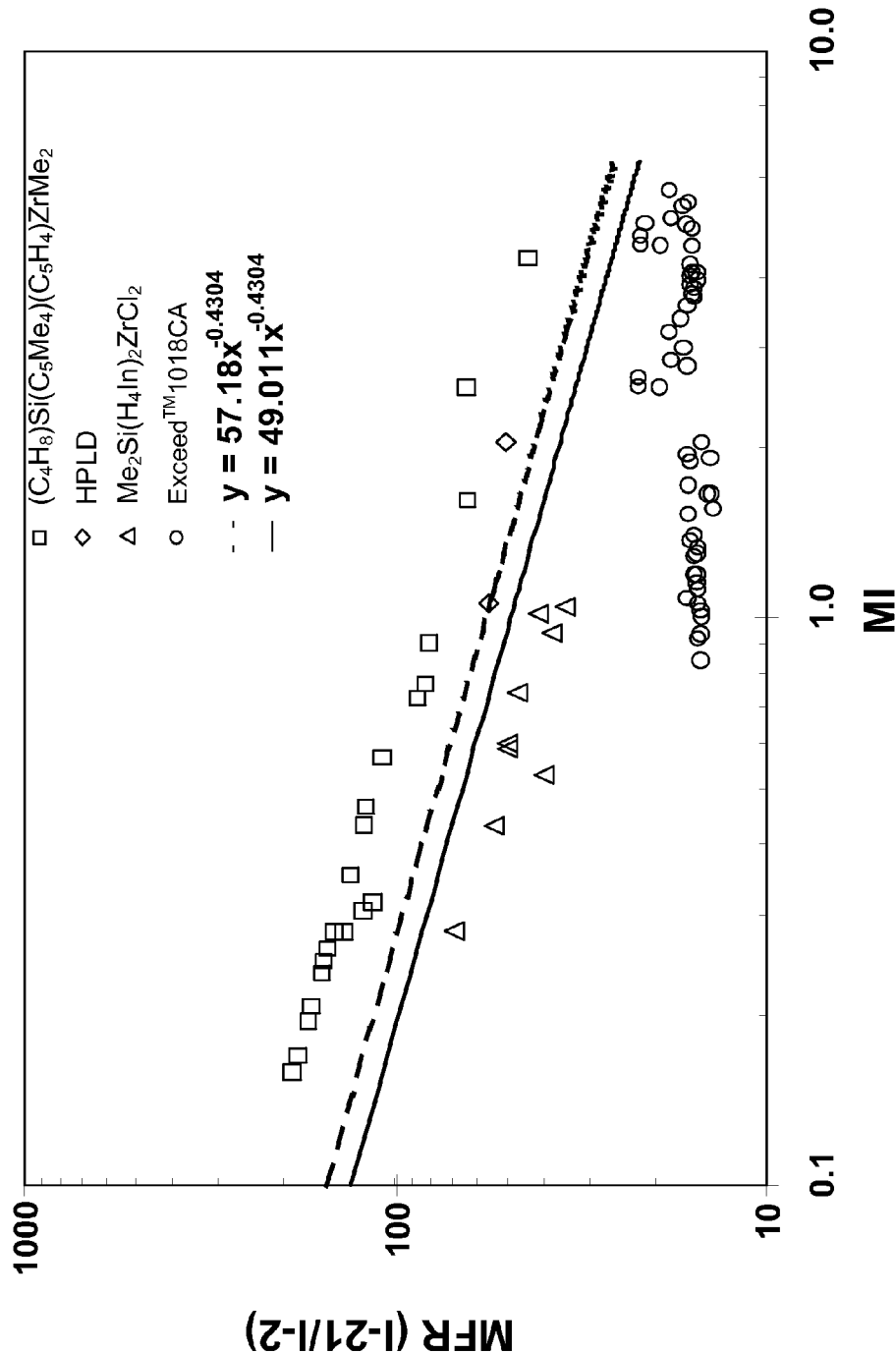
FIG. 3 is a graph of MFR v. MI for polymers of embodiments of the instant invention and comparative polymers.

The polymers of the invention in an embodiment have a melt index ratio ($I_{21}/I_2$) ($I_2$ is measured by ASTM-D-1238-F) equal to or greater than $49.011 \times MI^{(-0.4304)}$; more preferably equal to or greater than $57.18 \times MI^{(-0.4304)}$; as shown in FIG. 3.

In certain embodiments, the polymers as described herein may have a narrow composition distribution characterized in that the T75-T25 value is lower than 25, preferably lower than 20, more preferably lower than 15, and most preferably lower than 10, wherein T25 is the temperature at which 25% of the eluted polymer is obtained and T75 is the temperature at which 75% of the eluted polymer is obtained in a TREF experiment as described herein. The TREF-LS data reported herein were measured using an analytical size TREF instrument (Polymerchar, Spain), with a column of the following dimension: inner diameter (ID) 7.8 mm and outer diameter (OD) 9.53 mm and a column length of 150 mm. The column was filled with steel beads. 0.5 mL of a 6.4% (w/v) polymer solution in orthodichlorobenzene (ODCB) containing 6 g BHT/4 L were charged onto the column and cooled from 140° C. to 25° C. at a constant cooling rate of 1.0° C./min. Subsequently, ODCB was pumped through the column at a flow rate of 1.0 ml/min, and the column temperature was increased at a constant heating rate of 2° C./min to elute the polymer.

The polymers of an embodiment of the invention may be blended and/or coextruded with any other polymer. Non-limiting examples of other polymers include linear low density polyethylenes produced via conventional Ziegler-Natta and/or metallocene catalysis, elastomers, plastomers, high pressure low density polyethylene, high density polyethylenes, polypropylenes and the like.

Polymers produced by the process of an embodiment of the invention and blends thereof are useful in such forming operations as film, sheet, and fiber extrusion and co-extrusion as well as blow molding, injection molding and rotary molding. Films include blown or cast films formed by monolayer extrusion, coextrusion or by lamination useful as shrink sleeves, shrink wrap, bundle shrink, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

In all the examples below, the methylaluminoxane (MAO) used was a 30 weight percent MAO solution in toluene (typically 13.5 wt % Aluminum and 28.2 wt % MAO by NMR) available from Albemarle Corporation (Baton Rouge, La.). Davison 948 silica dehydrated to 600° C. (silica gel) was used and is available from W. R. Grace, Davison Chemical Division (Baltimore, Md.). Anhydrous, oxygen-free solvents were used. The synthesis of $(CH_2)_4Si(C_5Me_4(CH_2)_4Si(C_5Me_4)(C_5H_5)ZrCl_2$ is described in U.S. Pat. No. 6,388,155.

Preparation of $(CH_2)_4Si(C_5Me_4)(C_5H_5)ZrMe_2$. The comparative supported catalyst (1-Me, 3-Bu $Cp)_2ZrCl_2$ was prepared as described in U.S. Pat. No. 6,680,276.

A 1.6 M solution of methyl lithium and ether (184 mL, 0.294 mol) was slowly added to a stirred mixture of $(CH_2)_4Si(C_5Me_4)(C_5H_5)ZrCl_2$ (60 g, 0.139 mol) and ether (600 mL) in a 2 L flask. After stirring for 4 h, the ether was slowly removed with a $N_2$ purge then the remaining solids extracted with methylene chloride. The solvent was removed to give the product (41 g, 0.105 mol).

Preparation of Snowtex™ Blended Aluminum Stearate

A 4 L beaker was charged with Aluminum stearate (200 g) from Crompton Corporation (now Chemtura Corporation, Middlebury, Conn.), a 30 wt % suspension of Snowtex™ IPA-ST-ZL in isopropanol (164 g) from Nissan Chemical Industries Inc. (Houston, Tex.) and methanol (300 mL). The slurry was stirred at ambient for 2 hours then dried to a mud with a nitrogen purge. Vacuum and heat (108° C.) were applied for two days to remove residual solvent. The solids were crushed and sieved through a No. 25 mesh screen to give 20 wt % Snowtex™ flow aid (Nissan Chemical Industries Inc., Houston, Tex.) as a fine powder.

Preparation of Catalyst A

Crosfield ES757 silica (741 g) (INEOS Silicas Limited, Warrington, U.K.), dehydrated at 600° C., was added to a stirred (overhead mechanical conical stirrer) mixture of toluene (2 L) and 30 wt % solution of methyl aluminoxane in toluene (874 g, 4.52 mol). The silica was chased with toluene (200 mL) then the mixture was heated to 90° C. for 3 h. Afterwards, volatiles were removed by application of vacuum and mild heat (40° C.) overnight then the solid was allowed to cool to room temperature. To a stirred slurry of these solids and toluene (3 L), was slowly added a solution of $(CH_2)_4Si(C_5Me_4)(C_5H_5)ZrMe_2$ (16.8 g, 43.0 mmol) and toluene (1 L) over a 3 h period. After an additional 3 h, volatiles were removed by application of vacuum and mild heat (40° C.) overnight then the solid was allowed to cool to room temperature. This catalyst was dry-blended briefly with a mixture of 20 wt % Snowtex™ and 80 wt % aluminum stearate (7.5 wt % total of additive).

Preparation of Catalyst B

Crosfield ES70 silica (741 g), (INEOS Silicas Limited, Warrington, U.K.), dehydrated at 600° C., was added to a stirred (overhead mechanical conical stirrer) mixture of toluene (2 L) and 30 wt % solution of methyl aluminoxane in toluene (874 g, 4.52 mol). The silica was chased with toluene (200 mL) then the mixture was heated to 90° C. for 3 h. Afterwards, volatiles were removed by application of vacuum and mild heat (40° C.) overnight, then the solid was allowed to cool to room temperature. To a stirred slurry of these solids and toluene (3 L), was slowly added a solution of $(CH_2)_4Si(C_5Me_4)(C_5H_5)ZrMe_2$ (16.8 g, 43.0 mmol) and toluene (1 L) over a 3 h period. After an additional 3 h, volatiles were removed by application of vacuum and mild heat (40° C.) overnight then the solid was allowed to cool to room temperature. The solids were dry-blended briefly with 82.48 g of a mixture of 20 wt % SnowTex and 80 wt % aluminum stearate.

Preparation of Methyl Aluminoxane Supported on Silica (SMAO)

In a typical procedure, silica (741 g), dehydrated at 600° C., was added to a stirred (overhead mechanical conical stirrer) mixture of toluene (2 L) and 30 wt % solution of methyl aluminoxane in toluene (874 g, 4.52 mol). The silica was chased with toluene (200 mL) then the mixture was heated to 90° C. for 3 h. Afterwards, volatiles were removed by application of vacuum and mild heat (40° C.) overnight then the solid was allowed to cool to room temperature.

Preparation of Catalyst C

To a slurry of 4.5 mmol/g methyl aluminoxane supported on Davison 948 silica, dehydrated at 600° C., (40 g) and pentane (300 mL) stirred with an overhead stirrer, was slowly added a solution of $(CH_2)_4Si(C_5Me_4)(C_5H_5)ZrMe_2$ (670 mg, 1.72 mmol) and toluene. After stirring 18 h, the mixture was filtered and dried.

Polymerization with Catalyst C

These catalysts were tested in a continuous fluidized-bed gas-phase reactor with a nominal 14" reactor diameter, an average bed weight of about 1900 g, gas-velocity of about 1.6 ft/s, production rate of about 500 g/h. The reactor was operated at a pressure of 300 psig of which ethylene was 35 mol %. The balance of gas was made up with hydrogen, 1-hexene, and nitrogen as indicated in Table 2.

TABLE 2

Polymerization conditions

| Catalyst | Cat C |
|---|---|
| $H_2$ conc. (molppm) | 945 |
| Hexene conc. (mol %) | 0.444 |
| Reactor Temp (° C.) | 79 |

Examples 1 and 2

The polymers of Examples 1 and 2 were prepared from ethylene and butene-1 monomers in a pilot-scale continuous gas phase fluidized bed reactor using CAT A. The reactor was operated at 70° C. and 170 psi ethylene partial pressure. The fluidized bed was made up of polymer granules and the average bed weight was approximately 100 to 170 lbs. During the reaction, aluminum distearate was added to the reactor as a 20 wt % slurry in mineral oil at concentrations on a resin basis from 6 and 17 ppmw (parts per million weight). The conditions for making polymers of Examples 1 and 2 are listed in Table 3.

TABLE 3

Polymerization Conditions of Examples 1 and 2.

| Condition | Conditions for Polymer Example 1 | Conditions for Polymer Example 2 |
|---|---|---|
| Reactor Temp (° C.) | 70 | 70 |
| Ethylene partial pressure (psi) | 170 | 170 |
| H2/C2 molar ratio | 0.00289 | 0.00413 |
| C4/C2 molar ratio | 0.036 | 0.039 |

The reactor granules of Examples 1 and 2 were dry blended with additives before being compounded on a 2.5" Davis-Standard single-screw extruder equipped with mixing pins and underwater pelletizer at an output rate was approximately 100 lb/hr. The compounded pellets of examples 1 and 2 were then film extruded on a 2.5" Gloucester line with a 6" oscillating die and an air ring from Future Design Inc. (Mississauga, Ontario, Canada). The output rate was about 150 lbs/hr (8 lbs/hr-in die circumference) and the die gap was 45 mils. Film gauge was 1 mil and blow up ratio (BUR) varied from 2.5 to 3.5. Frost line height (FLH) was typically 20 to 24". The die temperature was about 199° C. (390° F.).

Table 4 compares the properties of the polymers of Examples 1 and 2 to the properties of the following reference polymers: Borealis Borstar FB2230 (Borealis A/S, Vienna, Austria). Dow DNDA7340 (The Dow Chemical Company, Midland, Mich.). Dow DPNH-1 (The Dow Chemical Company, Midland, Mich.). ExxonMobil LD103.09 (from Exxon Mobil Chemical Company, Houston, Tex.). The films of reference were made under similar conditions on the same film line.

TABLE 4

Properties of Polymers of Examples 1 and 2 and Reference Polymers

| | Units | Ex. 1 | Ex. 2 | Borealis Borstar FB2230 | Dow DNDA7340 | Dow DYNH-1 |
|---|---|---|---|---|---|---|
| Density | grams/cc | 0.9215 | 0.9220 | 0.9232 | 0.9230 | 0.9195 |
| $I_2$ (MI) | grams/10 min | 0.21 | 0.79 | 0.24 | 0.57 | 2.04 |
| $I_{21}$ (FI) | grams/10 min | 32.4 | 66.3 | 23.3 | 45.2 | 102.7 |
| MFR | — | 157 | 84 | 97 | 79 | 50 |
| $M_n$ | — | 22301 | 20381 | 9460 | 10310 | 14750 |
| $M_w$ | — | 93130 | 73968 | 192800 | 89730 | 89840 |
| $M_z$ | — | 226153 | 166365 | | 336880 | 268560 |
| MWD(PDI) ($M_w/M_n$) | — | 4.2 | 3.6 | 20.4 | 8.7 | 6.1 |
| LCB ($g'_{avg}$ vis. avg.) | | 0.6 | 0.70 | ~1.0 | 0.97 | 0.41 |
| LCB (g' @ 100,000 MW) | | 0.9 | 0.90 | — | 0.96 | 0.48 |
| LCB (g' @ 500,000 MW) | | 0.71 | 0.74 | — | 0.98 | 0.25 |
| Die Gap | mil | 45, 45 | 45, 45 | | 50 | 45, 45 |
| BUR | — | 2.5, 3.2 | 2.5, 3.2 | | 2.5 | 2.5, 3.5 |
| Gauge | mil | 2.12, 2.09 | 1.96, 2.09 | — | 1.95 | 1.97, 1.98 |
| Haze | % | 11, 9.6 | 6.3, 6.7 | | 29.7 | 8.1, 7.54 |
| Internal Haze | % | 1.20, 1.02 | 1.75, 1.94 | | 2.23 | 1.09, 1.37 |
| Normalized Internal Haze | %/mil | 0.57, 0.49 | 0.89, 0.93 | | 1.14 | 0.55, 0.69 |
| Clarity | % | 59, 62 | 74, 70 | | 1 | 36, 54 |
| MD Retromat Shrinkage | % | 64, 60 | 66, 60 | | 75 | 75, 71 |
| TD Retromat Shrinkage | % | 5.0, 19.3 | −7.5, 4.3 | | −10.8 | −12.5, 3.3 |
| Area Retromat Shrinkage | % | 65, 68 | 63, 62 | | 72 | 72, 72 |
| MD plastic shrink tension | MPa | 0.080, 0.074 | 0.065, 0.046 | | 0.155 | 0.095, 0.083 |
| MD thermal shrink tension | MPa | 0.548, 1.099 | 0.891, 1.074 | | break | 0.697, 0.939 |
| TD thermal shrink tension | MPa | 0.952, 1.110 | 1.008, 0.984 | | 0.000 | 0.500, 0.761 |
| Melt Strength | cN | 6.9 | 4.7 | 11.2 | 9.8 | 12.8 |
| Strain Hardening | — | no | some | no | no | yes |
| T75 | | 83 | 81.6 | 95.1 | 90.3 | |
| T25 | | 75.5 | 73.2 | 68.3 | 65.9 | |
| T75 − T25 | | 7.5 | 8.4 | 26.8 | 24.4 | |

| | Units | ExxonMobil LD103.09 | Polymer produced using $Me_2Si(H_4In)_2ZrCl_2$ as a catalyst | Polymer produced using $Me_2Si(H_4In)_2ZrCl_2$ as a catalyst |
|---|---|---|---|---|
| Density | grams/cc | 0.9202 | 0.9194 | 0.927 |
| $I_2$ (MI) | grams/10 min | 1.06 | 0.94 | 0.59 |
| $I_{21}$ (FI) | grams/10 min | 59.4 | 35.8 | 29.4 |
| MFR | — | 56 | 38 | 50 |
| $M_n$ | — | 17730 | 24563 | 30699 |
| $M_w$ | — | 116410 | 97355 | 107489 |
| $M_z$ | — | 318880 | 208826 | 248888 |
| MWD(PDI) ($M_w/M_n$) | — | 6.6 | 4.0 | 3.5 |
| LCB ($g'_{avg}$ vis. avg.) | | 0.37 | 0.99 | 0.98 |
| LCB (g' @ 100,000 MW) | | 0.46 | 1.00 | 1.00 |
| LCB (g' @ 500,000 MW) | | 0.25 | 0.89 | 0.89 |
| Die Gap | mil | 45 | | 30, 60 |
| BUR | — | 2.5 | | 3.5, 2.5 |
| Gauge | mil | 1.97 | | 2.05, 2.08 |
| Haze | % | 11.3 | | 10.7, 13.5 |
| Internal Haze | % | 0.70 | | 2.99, 3.27 |
| Normalized Internal Haze | %/mil | 0.36 | | 1.46, 1.57 |

TABLE 4-continued

Properties of Polymers of Examples 1 and 2 and Reference Polymers

|  |  |  |  |
|---|---|---|---|
| Clarity | % | 31 | 67, 66 |
| MD Retromat Shrinkage | % | 79 | 52, 64 |
| TD Retromat Shrinkage | % | 2.8 | 4.5, −15.0 |
| Area Retromat Shrinkage | % | 79 | 54, 59 |
| MD plastic shrink tension | MPa | 0.167 | 0.029, 0.046 |
| MD thermal shrink tension | MPa | 0.921 | 1.213, 1.216 |
| TD thermal shrink tension | MPa | 0.708 | 1.335, 0.246 |
| Melt Strength | cN | 19.5 | 5.7 |
| Strain Hardening | — | yes | |
| T75 | | 81.6 | 88.2 |
| T25 | | 75.3 | 83.6 |
| T75 − T25 | | 6.3 | 4.6 |

Example 3

Catalyst B

As shown in this example, a polymer of an embodiment of the invention can improve the optical properties of other LLDPE polymers when it is blended in as a minor component. In this example, a polymer of an embodiment of this invention was blended in at 10% (by weight) of the final product using an on-line blending set-up on a Battenfeld Gloucester (Gloucester, Mass.) film line. In this set-up, the blend components were weighted separately according to the blend ratio and added to a mixing chamber, where the components were mixed by agitation before they were discharged into a feed hopper above the extruder. The line was equipped with a 2.5" single screw extruder, a 6" oscillating die and an air ring from Future Design Inc. (Mississauga, Ontario, Canada). The output rate was 151 lbs/hr (8 lbs/hr-in dir circumference) and the die gap was 45 mil. Film gauge was 1 mil and BUR was held constant at 2.5. FLH was typically 20 to 24". The die temperature was 390° F. Table 5 shows these haze improvements for different blends. This polymer has a density of 0.9220 grams/cc, an MI ($I_2$) of 0.76 grams/10 min and a MFR of 99.3. It was made using CAT B under similar conditions as Examples 1 and 2.

When a polymer of an embodiment of the invention is blended into other LLDPE polymers as a minor component, in addition to the benefit of enhancing the base polymer's optical properties, the polymer also improves their TD tear resistance while largely maintains their MD tear resistance unchanged or causes insignificant or small loss. In contrast, when these LLDPEs are blended with HP-LDPE to improve optical properties, the loss in toughness is dramatic. Additionally, blending such polymers also improves the extrusion performance of the base polymers, as indicated by the increase in the specific output (lbs/hp-hr), making the extrusion process more energy efficient.

Example 4

Polymers were prepared from ethylene ($C_2$) and butene-1 (C4) monomers in a pilot-scale continuous gas phase fluidized bed reactor using $(CH_2)_4Si(C_5Me_4)(C_5H_5)ZrMe_2$ (CAT A). The reactor was operated at temperatures of 70° C. and 85° C., and ethylene partial pressures of 170 and 220 psi. The fluidized bed was made up of polymer granules and the average bed weight was approximately 100 to 170 lbs. During the reaction, aluminum distearate was added to the reactor as a 20 wt % slurry in mineral oil at concentrations on a resin basis from 6 and 24 ppmw (parts per million weight). The comono-

TABLE 5

Haze improvements for LLDPE where 10 wt. % $(C_4H_8)Si(C_5Me_4)(C_5H_4)ZrMe_2$ catalyzed product was added.

| Catalyst | Average Gauge (mil) | Film Haze (%) | Internal Haze (%) | MD Tear (g/mil) | TD Tear (g/mil) | Specific Output (lb/hp-hr) |
|---|---|---|---|---|---|---|
| 100%(1,3-Me, n-Bu-Cp)$_2$ZrCl$_2$ | 0.97 | 19.6 | 1.54 | 244 | 355 | 11.26 |
| 90%(1,3-Me, n-Bu-Cp)$_2$ZrCl$_2$/ 10% (C$_4$H$_8$)Si(C$_5$Me$_4$)(C$_5$H$_4$)ZrMe$_2$ | 0.97 | 3.4 | 0.97 | 238 | 482 | 12.11 |
| 100% LL3001.63 | 0.98 | 11.0 | 2.27 | 381 | 588 | 14.79 |
| 90% LL3001.63/ 10% (C$_4$H$_8$)Si(C$_5$Me$_4$)(C$_5$H$_4$)ZrMe$_2$ | 0.99 | 9.7 | 1.94 | 274 | 650 | 14.17 |
| 100% C$_5$H$_4$—CH$_2$CH$_2$CH$_3$)$_2$Hf(CH$_3$)$_2$ | 0.97 | 25.1 | 2.46 | 248 | 389 | 14.63 |
| 90% C$_5$H$_4$—CH$_2$CH$_2$CH$_3$)$_2$Hf(CH$_3$)$_2$/ 10% (C$_4$H$_8$)Si(C$_5$Me$_4$)(C$_5$H$_4$)ZrMe$_2$ | 1.00 | 7.2 | 1.92 | 239 | 489 | 15.05 |
| 100% C$_5$H$_4$—CH$_2$CH$_2$CH$_3$)$_2$Hf(CH$_3$)$_2$ | 0.98 | 11.5 | 2.24 | 304 | 425 | 12.62 |
| 90% C$_5$H$_4$—CH$_2$CH$_2$CH$_3$)$_2$Hf(CH$_3$)$_2$/ 10% (C$_4$H$_8$)Si(C$_5$Me$_4$)(C$_5$H$_4$)ZrMe$_2$ | 1.00 | 6.5 | 1.79 | 239 | 524 | 13.11 |
| 100% (C$_4$H$_8$)Si(C$_5$Me$_4$)(C$_5$H$_4$)ZrMe$_2$ | 0.99 | 8.7 | 0.84 | 25 | 324 | 21.43 | mer concentration in the reactor was changed; its effect on product was recorded, and is shown below in Tables 7 and 8.

For comparative purpose, a polymer was generated using (1-Me, 3-Bu Cp)$_2$ZrCl$_2$ as the catalyst. The reactor was operating at 85° C. and 220 psi ethylene partial pressure. The comonomer, butene-1, concentration was changed from approximately 1.4 mol % to approximately 4.6 mol %, with other process parameters held constant. The melt flow index (MI or I$_2$) of the product only changed from approximately 2.0 to 0.9 g/10 min.

TABLE 6

MI change using (1,3-Me, n-Bu-Cp)$_2$ZrCl$_2$ as catalyst
(Comparative)

| Time (hr) | Reactor Temperature (° C.) | Ethylene Partial Pressure (psi) | H2/C2 Ratio | Ethylene (Mol. %) | Butene-1 (Mol. %) | C4/C2 ratio | Product I$_2$ (g/10 min) | Product Density (g/cc) |
|---|---|---|---|---|---|---|---|---|
| 1 | 84.97 | 220.29 | 0.0003 | 65.51 | 1.40 | 0.0213 | 1.67 | 0.9230 |
| 2 | 84.99 | 221.24 | 0.0003 | 65.69 | 1.35 | 0.0206 | | |
| 3 | 85.02 | 219.73 | 0.0003 | 65.34 | 1.33 | 0.0204 | | |
| 4 | 84.98 | 218.62 | 0.0003 | 64.97 | 1.32 | 0.0204 | 1.93 | 0.9226 |
| 5 | 85.00 | 221.23 | 0.0003 | 65.64 | 1.32 | 0.0201 | | |
| 6 | 84.99 | 221.28 | 0.0003 | 65.68 | 1.36 | 0.0206 | | |
| 7 | 85.00 | 220.17 | 0.0003 | 65.51 | 1.41 | 0.0215 | 2.06 | 0.9330 |
| 8 | 85.03 | 219.94 | 0.0003 | 65.35 | 1.41 | 0.0215 | | |
| 9 | 85.00 | 218.70 | 0.0003 | 65.04 | 1.40 | 0.0216 | | |
| 10 | 84.98 | 218.86 | 0.0003 | 64.99 | 1.40 | 0.0216 | 1.90 | 0.9341 |
| 11 | 84.99 | 221.53 | 0.0003 | 65.75 | 1.41 | 0.0214 | | |
| 12 | 85.01 | 221.14 | 0.0002 | 65.72 | 1.41 | 0.0215 | | |
| 13 | 84.98 | 220.57 | 0.0002 | 65.60 | 1.41 | 0.0215 | 1.73 | 0.9347 |
| 14 | 85.06 | 219.04 | 0.0002 | 65.05 | 1.41 | 0.0217 | | |
| 15 | 85.02 | 218.27 | 0.0002 | 64.89 | 1.41 | 0.0218 | | |
| 16 | 85.01 | 218.05 | 0.0002 | 64.88 | 1.40 | 0.0216 | 1.54 | 0.9341 |
| 17 | 84.97 | 220.70 | 0.0002 | 65.39 | 1.42 | 0.0216 | | |
| 18 | 85.04 | 220.92 | 0.0002 | 65.51 | 1.61 | 0.0245 | | |
| 19 | 84.95 | 220.91 | 0.0002 | 65.46 | 1.26 | 0.0192 | 1.39 | 0.9333 |
| 20 | 85.08 | 218.27 | 0.0002 | 64.79 | 1.96 | 0.0301 | | |
| 21 | 84.93 | 217.84 | 0.0002 | 64.77 | 2.30 | 0.0356 | | |
| 22 | 84.84 | 224.06 | 0.0002 | 66.23 | 2.92 | 0.0439 | 1.31 | 0.9311 |
| 23 | 85.30 | 220.91 | 0.0002 | 65.44 | 3.42 | 0.0522 | | |
| 24 | 84.91 | 218.60 | 0.0002 | 64.52 | 3.97 | 0.0610 | | |
| 25 | 84.84 | 220.58 | 0.0002 | 65.72 | 4.47 | 0.0681 | 1.17 | 0.9255 |
| 26 | 85.38 | 219.43 | 0.0002 | 65.24 | 4.55 | 0.0698 | | |
| 27 | 84.85 | 216.03 | 0.0002 | 64.27 | 4.62 | 0.0720 | | |
| 28 | 84.99 | 223.20 | 0.0002 | 66.08 | 4.53 | 0.0682 | 0.94 | 0.9195 |
| 29 | 84.99 | 221.31 | 0.0002 | 65.95 | 4.59 | 0.0696 | | |
| 30 | 84.96 | 222.07 | 0.0002 | 65.90 | 4.58 | 0.0693 | | |
| 31 | 85.07 | 219.31 | 0.0002 | 65.36 | 4.59 | 0.0704 | 0.85 | 0.9182 |
| 32 | 84.92 | 220.94 | 0.0002 | 65.73 | 4.55 | 0.0693 | | |
| 33 | 85.01 | 220.87 | 0.0003 | 65.73 | 4.60 | 0.0699 | | |
| 34 | 84.99 | 220.55 | 0.0003 | 65.54 | 4.58 | 0.0698 | 0.93 | 0.9180 |

(CH$_2$)4Si(C$_5$Me$_4$)(C$_5$H$_5$)ZrMe$_2$ (CAT A) was used to produce ethylene (C$_2$) and butene-1 (C$_4$) copolymer in a pilot-scale continuous gas phase fluidized bed reactor. The reactor temperature was at 70° C. and reactor ethylene partial pressure was at approximately 150 psi. The comonomer, butene-1, concentration was changed from approximately 1.3 mol. % to approximately 0.7 mol. %, with other process parameters held constant. Results are shown in Table 7. The melt index (MI or I$_2$) of the product changed significantly from approximately 5 to 20 g/10 min.

TABLE 7

MI change using (CH$_2$)$_4$Si(C$_5$Me$_4$)(C$_5$H$_5$)ZrMe$_2$ (CAT A) as catalyst

| Time (hr) | Reactor Temperature (° C.) | Ethylene Partial Pressure (psi) | H2/C2 Ratio | Ethylene (Mol %) | Butene-1 (Mol %) | C4/C2 ratio | Product I2 (g/10 min) |
|---|---|---|---|---|---|---|---|
| 1 | 66.89 | 149.11 | 0.0031 | 44.57 | 1.34 | 0.0301 | |
| 2 | 36.35 | 150.87 | 0.0030 | 45.07 | 1.33 | 0.0298 | 4.98 |
| 3 | 51.15 | 154.37 | 0.0029 | 45.52 | 1.31 | 0.0287 | |
| 4 | 70.12 | 146.13 | 0.0028 | 43.18 | 0.93 | 0.0214 | |
| 5 | 70.00 | 149.45 | 0.0027 | 44.24 | 0.52 | 0.0119 | |
| 6 | 69.98 | 154.75 | 0.0030 | 45.82 | 0.53 | 0.0115 | |

TABLE 7-continued

MI change using $(CH_2)_4Si(C_5Me_4)(C_5H_5)ZrMe_2$ (CAT A) as catalyst

| Time (hr) | Reactor Temperature (° C.) | Ethylene Partial Pressure (psi) | H2/C2 Ratio | Ethylene (Mol %) | Butene-1 (Mol %) | C4/C2 ratio | Product 12 (g/10 min) |
|---|---|---|---|---|---|---|---|
| 7 | 69.97 | 151.98 | 0.0029 | 45.12 | 0.55 | 0.0120 | |
| 8 | 69.96 | 151.65 | 0.0029 | 45.06 | 0.56 | 0.0124 | 3.33 |
| 9 | 70.02 | 151.81 | 0.0029 | 45.03 | 0.60 | 0.0132 | |
| 10 | 70.02 | 151.62 | 0.0029 | 45.00 | 0.61 | 0.0137 | |
| 11 | 70.01 | 149.30 | 0.0029 | 44.26 | 0.62 | 0.0141 | |
| 12 | 70.02 | 146.60 | 0.0030 | 43.60 | 0.63 | 0.0143 | |
| 13 | 69.99 | 147.00 | 0.0029 | 43.66 | 0.59 | 0.0136 | |
| 14 | 70.02 | 148.02 | 0.0029 | 43.90 | 0.57 | 0.0131 | 6.14 |
| 15 | 70.04 | 148.15 | 0.0029 | 43.95 | 0.58 | 0.0132 | |
| 16 | 70.04 | 147.77 | 0.0028 | 43.84 | 0.70 | 0.0160 | |
| 17 | 69.97 | 148.89 | 0.0028 | 44.00 | 0.70 | 0.0160 | |
| 18 | 70.00 | 149.86 | 0.0029 | 44.43 | 0.71 | 0.0159 | |
| 19 | 70.02 | 149.44 | 0.0029 | 44.29 | 0.71 | 0.0160 | |
| 20 | 70.00 | 149.48 | 0.0029 | 44.37 | 0.71 | 0.0159 | 16.41 |
| 21 | 70.01 | 150.06 | 0.0029 | 44.47 | 0.70 | 0.0158 | |
| 22 | 70.02 | 149.90 | 0.0029 | 44.52 | 0.71 | 0.0159 | |
| 23 | 70.04 | 150.04 | 0.0029 | 44.60 | 0.71 | 0.0159 | 19.70 |
| 24 | 69.99 | 149.73 | 0.0029 | 44.43 | 0.72 | 0.0161 | |
| 25 | 70.02 | 148.84 | 0.0028 | 44.18 | 0.76 | 0.0170 | |
| 26 | 70.01 | 149.56 | 0.0027 | 44.26 | 0.86 | 0.0193 | 19.98 |

This experiment was repeated one more time, also using $(CH_2)_4Si(C_5Me_4)(C_5H_5)ZrMe_2$ (CAT A) as catalyst, but at somewhat different reactor conditions. The reactor temperature was the same at 70° C., but the reactor ethylene partial pressure was at 170 psi and the $H_2/C_2$ ratio was at approximately 0.0040. The reactor was steadily making approximately 1.0 (g/10 min) Melt Index product for extended period of time before the comonomer, butene-1, concentration was changed from approximately 2.0 mol. % to approximately 0.55 mol. %, with other process parameters held constant. Results are shown in Table 8. The melt index (MI or $I_2$) of the product changed dramatically from 1.0 to over 100 g/10 min. This level of change is very significant and unexpected from other metallocene catalysts such as $Me_2Si(H_4In)_2ZrCl_2$ given in the comparative example.

TABLE 8

MI change using $(CH_2)_4Si(C_5Me_4)(C_5H_5)ZrMe_2$ (CAT A) as catalyst under somewhat different reaction conditions

| Time (hr) | Reactor Temperature (C.) | Ethylene Partial Pressure (psi) | H2/C2 Ratio | Ethylene (Mol. %) | Butene-1 (Mol. %) | C4/C2 ratio | Product 12 (g/10 min) | Product Density (g/cc) |
|---|---|---|---|---|---|---|---|---|
| 1 | 69.99 | 166.90 | 0.0043 | 49.63 | 1.97 | 0.0398 | 1.06 | 0.9217 |
| 2 | 69.96 | 169.27 | 0.0041 | 50.25 | 1.94 | 0.0387 | | |
| 3 | 69.99 | 170.68 | 0.0042 | 50.58 | 1.92 | 0.0379 | | |
| 4 | 70.02 | 171.23 | 0.0042 | 50.76 | 1.91 | 0.0375 | 0.89 | 0.9217 |
| 5 | 70.05 | 169.96 | 0.0042 | 50.42 | 1.88 | 0.0372 | | |
| 6 | 70.04 | 168.85 | 0.0042 | 50.11 | 1.87 | 0.0372 | | |
| 7 | 69.97 | 169.91 | 0.0042 | 50.23 | 1.88 | 0.0373 | 0.95 | 0.9217 |
| 8 | 70.02 | 169.44 | 0.0042 | 50.38 | 1.87 | 0.0372 | | |
| 9 | 70.04 | 167.54 | 0.0042 | 49.88 | 1.85 | 0.0374 | | |
| 10 | 70.00 | 169.18 | 0.0042 | 50.22 | 1.88 | 0.0374 | 0.95 | 0.9219 |
| 11 | 70.10 | 167.89 | 0.0042 | 49.95 | 1.95 | 0.0391 | | |
| 12 | 69.97 | 168.13 | 0.0042 | 50.00 | 1.96 | 0.0392 | | |
| 13 | 70.01 | 169.57 | 0.0041 | 50.31 | 1.96 | 0.0389 | 0.97 | 0.9221 |
| 14 | 69.96 | 170.48 | 0.0042 | 50.53 | 1.98 | 0.0391 | | |
| 15 | 70.02 | 170.09 | 0.0042 | 50.50 | 1.97 | 0.0390 | | |
| 16 | 70.01 | 168.75 | 0.0042 | 50.22 | 1.96 | 0.0391 | 0.88 | 0.9216 |
| 17 | 69.99 | 170.69 | 0.0042 | 50.63 | 1.98 | 0.0390 | | |
| 18 | 70.01 | 170.48 | 0.0042 | 50.60 | 1.98 | 0.0390 | | |
| 19 | 69.99 | 170.17 | 0.0042 | 50.49 | 1.98 | 0.0390 | 0.83 | 0.9213 |
| 20 | 70.03 | 169.57 | 0.0042 | 50.39 | 1.97 | 0.0391 | | |
| 21 | 70.01 | 168.50 | 0.0041 | 50.10 | 1.95 | 0.0389 | | |
| 22 | 70.00 | 170.52 | 0.0041 | 50.56 | 1.97 | 0.0389 | 0.80 | 0.9209 |
| 23 | 69.97 | 169.99 | 0.0041 | 50.61 | 1.97 | 0.0391 | | |
| 24 | 69.94 | 171.83 | 0.0041 | 51.08 | 1.99 | 0.0389 | | |
| 25 | 69.99 | 172.83 | 0.0041 | 51.10 | 2.00 | 0.0389 | 0.78 | 0.9204 |
| 26 | 70.04 | 169.70 | 0.0042 | 50.63 | 1.98 | 0.0392 | | |
| 27 | 69.98 | 170.21 | 0.0042 | 50.44 | 1.98 | 0.0391 | | |
| 28 | 70.02 | 169.22 | 0.0042 | 50.27 | 1.96 | 0.0390 | 0.77 | 0.9208 |
| 29 | 70.01 | 169.60 | 0.0041 | 50.39 | 1.81 | 0.0361 | | |

TABLE 8-continued

MI change using $(CH_2)_4Si(C_5Me_4)(C_5H_5)ZrMe_2$ (CAT A) as catalyst under somewhat different reaction conditions

| Time (hr) | Reactor Temperature (C.) | Ethylene Partial Pressure (psi) | H2/C2 Ratio | Ethylene (Mol. %) | Butene-1 (Mol. %) | C4/C2 ratio | Product 12 (g/10 min) | Product Density (g/cc) |
|---|---|---|---|---|---|---|---|---|
| 30 | 69.95 | 170.91 | 0.0040 | 50.78 | 0.91 | 0.0180 | | |
| 31 | 69.99 | 171.78 | 0.0039 | 50.92 | 0.59 | 0.0116 | 0.91 | 0.9221 |
| 32 | 70.02 | 169.48 | 0.0039 | 50.38 | 0.57 | 0.0113 | | |
| 33 | 70.02 | 167.94 | 0.0038 | 50.05 | 0.57 | 0.0114 | | |
| 34 | 70.09 | 168.98 | 0.0037 | 50.14 | 0.55 | 0.0110 | 2.56 | 0.9266 |
| 35 | 69.91 | 170.01 | 0.0037 | 50.81 | 0.54 | 0.0106 | | |
| 36 | 70.01 | 172.03 | 0.0039 | 51.18 | 0.55 | 0.0108 | | |
| 37 | 69.98 | 170.23 | 0.0040 | 50.80 | 0.54 | 0.0107 | 14.07 | 0.9359 |
| 38 | 70.03 | 169.92 | 0.0040 | 50.87 | 0.56 | 0.0110 | | |
| 39 | 70.00 | 169.47 | 0.0040 | 50.55 | 0.55 | 0.0109 | | |
| 40 | 70.00 | 170.20 | 0.0040 | 50.74 | 0.55 | 0.0108 | 51.41 | 0.9408 |
| 41 | 70.00 | 170.15 | 0.0040 | 50.75 | 0.56 | 0.0110 | | |
| 42 | 70.01 | 169.70 | 0.0040 | 50.66 | 0.56 | 0.0111 | | |
| 43 | 70.00 | 169.36 | 0.0040 | 50.56 | 0.56 | 0.0111 | 84.96 | 0.9432 |
| 44 | 69.95 | 171.02 | 0.0040 | 50.94 | 0.56 | 0.0109 | | |
| 45 | 69.96 | 172.51 | 0.0041 | 51.32 | 0.57 | 0.0111 | | |
| 46 | 69.98 | 172.44 | 0.0042 | 51.36 | 0.57 | 0.0112 | 129.30 | 0.9454 |

Example 5

When subjected to uniaxial extension, the extensional viscosity of a polymer increases with strain rate. The transient uniaxial extensional viscosity of a linear polymer can be predicted as is known to those skilled in the art. Strain hardening occurs when the polymer is subjected uniaxial extension and the transient extensional viscosity increases more than what is predicted from linear viscoelastic theory.

FIGS. 1 and 2 show strain hardening at 150° C. of ethylene/hexene copolymers of an embodiment of the instant invention prepared using a lab-scale gas phase reactor and CAT C as a catalyst (Example 5 and FIG. 2). This is compared to Exxon-Mobil LD103.09 (from ExxonMobil Chemical Company, Houston, Tex.) (FIG. 1). The samples were compounded on a Haake Polylab system (Thermo Fisher Scientific, Inc., Waltham, Mass.) and blown into films on a Haake-Brabender combination system (Thermo Fisher Scientific, Inc., Waltham, Mass.).

FIG. 3 is a graph of MFR v. MI for polymers of embodiments of the instant invention (using $(C_4H_8)Si(C_5Me_4)(C_5H_4)ZrMe_2$ as the catalyst) and comparative polymers. As seen from this Figure, polymers of embodiments of the instant invention satisfy the following relations: MFR > $(49.011 \times MI^{(-0.4304)})$ and MFR > $(57.18 \times MI^{(0.4304)})$.

Figure 4:
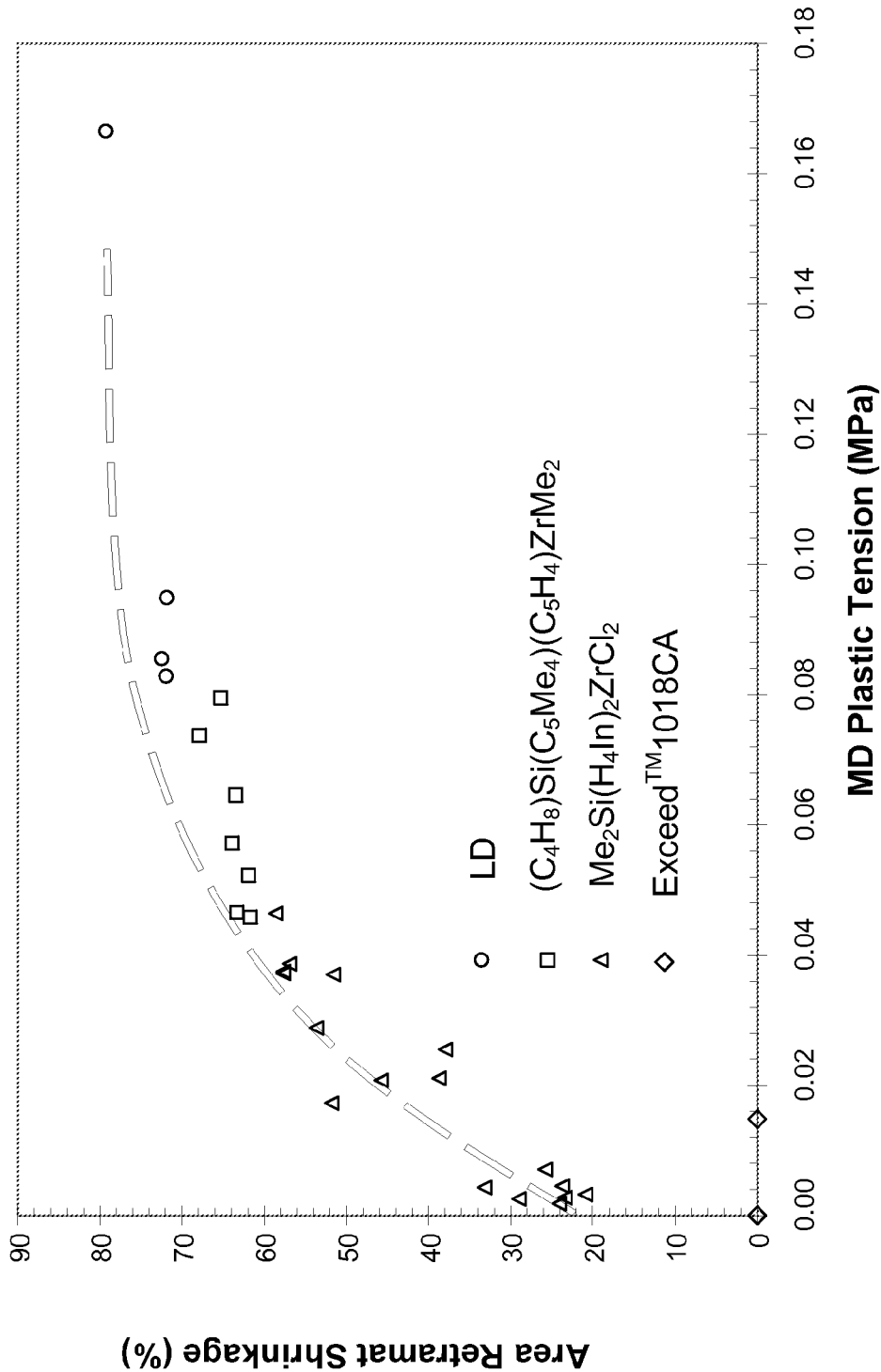
FIG. 4 is a graph of Area Retramat shrinkage v. MD Plastic Tension for polymers of embodiments of the instant invention and comparative polymers.

FIG. 4 is a graph of Retramat shrinkage v. MD Plastic Force for films made from polymers of embodiments of the instant invention (using $(C_4H_8)Si(C_5Me_4)(C_5H_4)ZrMe_2$ as the catalyst) including Examples 1 and 2, and comparative films. As seen from this Figure, the films of embodiments of the instant invention generally have an area Retromat shrinkage of greater than 60% and an MD plastic tension of less than about 0.08 MPa.

Figure 5:
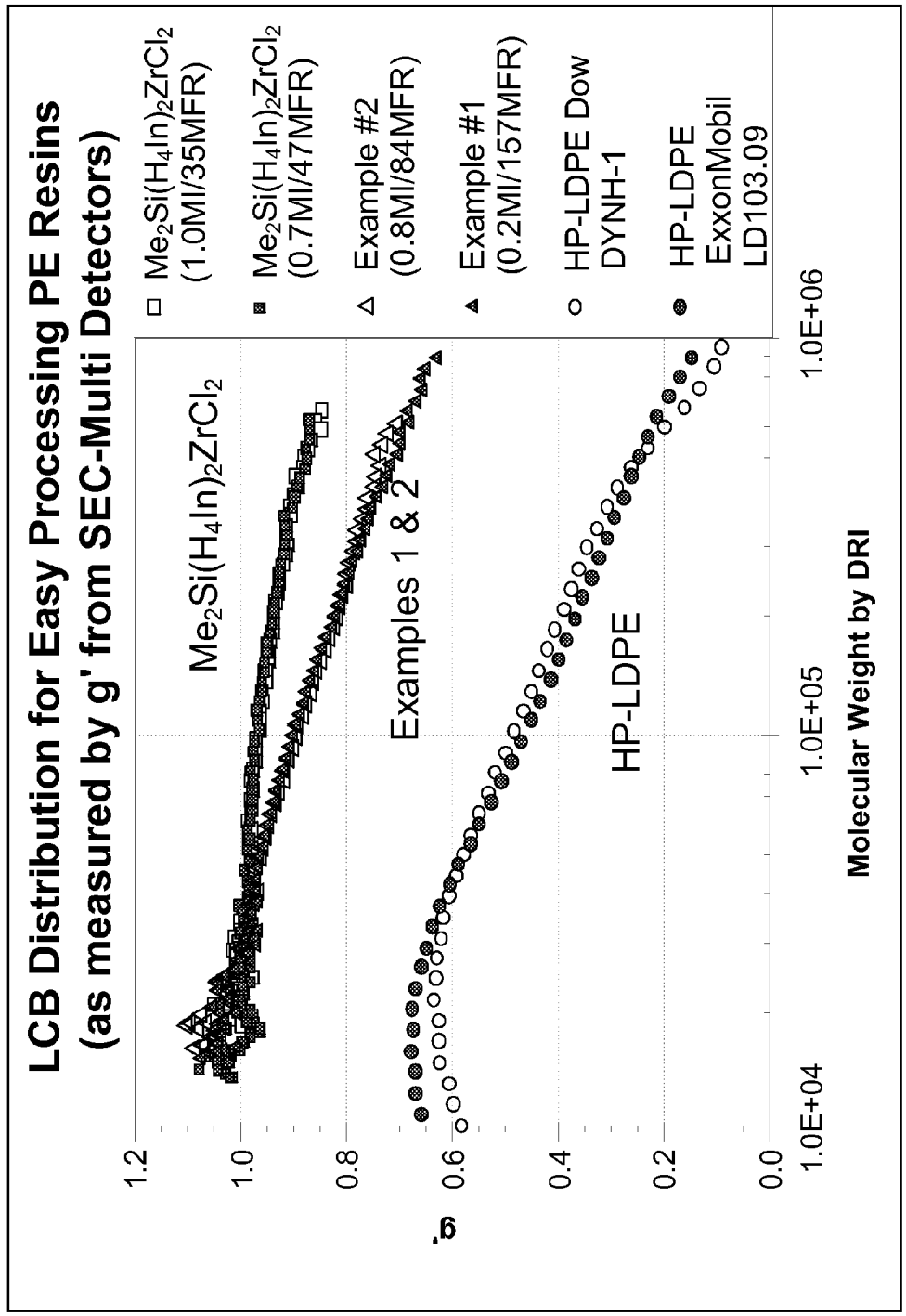
FIG. 5 is a graph of g' v. molecular weight for polymers of embodiments of the instant invention and comparative polymers.

FIG. 5 is a graph of g' v. molecular weight for polymers of embodiments of the instant invention (using $(C_4H_8)Si(C_5Me_4)(C_5H_4)ZrMe_2$ as the catalyst) and comparative polymers. As seen from this Figure, polymers of embodiments of the instant invention satisfy the following relations: $0.5 \leq g'_{avg} \leq 0.9$ and $M_w/M_n \leq 4.6$.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

We claim:
1. A process for improving the film haze of a polymer, said process comprising:
  a) forming a polymer by polymerizing ethylene, an olefin monomer having from 3 to 8 carbon atoms, and, optionally, one or more other olefin monomers having from 2 to 30 carbon atoms in the presence of a catalyst system comprising a cyclic bridged metallocene activated by an activator, the activator comprising aluminoxane, a modified aluminoxane, or a mixture thereof, and a support, wherein the cyclic bridged metallocene is $L^A(R'SiR')L^BZrQ_2$), where $L^A$ and $L^B$ are independently an unsubstituted or a substituted cyclopentadienyl ligand bonded to Zr and defined by the formula ($C_5H_{4-d}R_d$), where R is hydrogen, a hydrocarbyl substituent, a substituted hydrocarbyl substituent, or a heteroatom substituent, and where d is 0, 1, 2, 3 or 4;

$L^A$ and $L^B$ are connected to one another with a cyclic silicon bridge, R'SiR', where R' are independently hydrocarbyl or substituted hydrocarbyl substituents that are connected with each other to form a silacycle ring;

each Q is labile hydrocarbyl or a substituted hydrocarbyl ligand; and b) blending the polymer with another polymer comprising olefin monomers having 2 to 30 carbon atoms to produce a polymer blend, wherein the amount of polymer a) in the blend is a minor amount of about 1% to about 50% by weight of the blend, and wherein a film extruded from said polymer blend has a haze, according to ASTM D-1003, that is less than a film extruded under identical conditions from said another polymer comprising olefin monomers having 2 to 30 carbon atoms alone.

2. The process of claim 1, wherein the cyclic bridged metallocene is cyclotetramethylenesilyl (tetramethylcyclopentadienyl)(cyclopentadienyl) zirconium dimethyl.

3. The process of claim 1, wherein the amount of polymer a) in the blend is about 5% to about 20% by weight.

4. The process of claim 1, wherein the support comprises a Group 2, 3, 4, 5, 13 or 14 metal inorganic oxide.

5. The process of claim 1, wherein the activator comprises methylaluminoxane (MAO) and the support comprises silica.

6. The process of claim 1, wherein the polymer has a molecular weight distribution (Mw/Mn) of no greater than about 4.2.

7. The process of claim 1, wherein the polymer has a molecular weight distribution (Mw/Mn) about 3.6 to about 4.2.

* * * * *